United States Patent
Bai et al.

(10) Patent No.: US 11,196,783 B2
(45) Date of Patent: Dec. 7, 2021

(54) METHOD, DEVICE, AND SYSTEM FOR FACILITATING GROUP CONFERENCE COMMUNICATION

(71) Applicant: Tencent Technology (Shenzhen) Company Limited, Shenzhen (CN)

(72) Inventors: Xingshi Bai, Shenzhen (CN); Shundong Gao, Shenzhen (CN); Xingjun Xiao, Shenzhen (CN); Haoyuan Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 231 days.

(21) Appl. No.: 16/433,307

(22) Filed: Jun. 6, 2019

(65) Prior Publication Data
US 2019/0289047 A1    Sep. 19, 2019

Related U.S. Application Data

(63) Continuation of application No. PCT/CN2018/071888, filed on Jan. 9, 2018.

(30) Foreign Application Priority Data

Jan. 23, 2017  (CN) .......................... 2017100515868

(51) Int. Cl.
*H04L 29/06*     (2006.01)
*H04L 12/18*     (2006.01)

(52) U.S. Cl.
CPC .......... *H04L 65/4053* (2013.01); *H04L 12/18* (2013.01); *H04L 12/1818* (2013.01)

(58) Field of Classification Search
CPC . H04L 65/4053; H04L 12/18; H04L 12/1818; H04L 12/1822; H04L 29/06; H04L 65/1006
See application file for complete search history.

(56) References Cited

U.S. PATENT DOCUMENTS

| | | | |
|---|---|---|---|
| 2002/0118808 A1* | 8/2002 | Kelleher | H04M 3/563 379/202.01 |
| 2004/0001446 A1* | 1/2004 | Bhatia | G06Q 10/109 370/261 |

(Continued)

FOREIGN PATENT DOCUMENTS

| | | |
|---|---|---|
| CN | 1976434 A | 6/2007 |
| CN | 101035007 A | 9/2007 |

(Continued)

OTHER PUBLICATIONS

International Search Report dated Mar. 27, 2018 for PCT Application No. PCT/CN2018/071888 (8 pp.).

(Continued)

*Primary Examiner* — Jael M Ulysse
(74) *Attorney, Agent, or Firm* — Crowell & Moring LLP

(57) ABSTRACT

A conferencing communication method is disclosed, including: sending a protocol string to an intelligent terminal, so that the intelligent terminal invokes a corresponding instant messaging client according to the protocol string; receiving an instant messaging user identifier that has logged in and that is sent by the instant messaging client and an attendance credential included in the protocol string; adding the instant messaging user identifier to an instant messaging user group corresponding to the attendance credential; and establishing an Internet channel that is based on the instant messaging user group to the instant messaging client, the Internet channel being used for transmitting communication data of a member in the instant messaging user group.

20 Claims, 19 Drawing Sheets

(56) References Cited

U.S. PATENT DOCUMENTS

| | | | |
|---|---|---|---|
| 2004/0071099 A1* | 4/2004 | Costa-Requena | H04L 29/06 370/260 |
| 2004/0072593 A1* | 4/2004 | Robbins | H04M 7/006 455/560 |
| 2004/0266426 A1* | 12/2004 | Marsh | H04W 36/0066 455/426.2 |
| 2005/0034079 A1* | 2/2005 | Gunasekar | G06Q 10/10 715/753 |
| 2006/0092269 A1* | 5/2006 | Baird | H04L 65/4046 348/14.08 |
| 2006/0244818 A1* | 11/2006 | Majors | H04L 12/1822 348/14.08 |
| 2007/0106724 A1* | 5/2007 | Gorti | H04L 67/22 709/204 |
| 2007/0274283 A1* | 11/2007 | Baker | H04L 65/1006 370/351 |
| 2008/0069011 A1* | 3/2008 | Sekaran | H04L 65/4038 370/260 |
| 2008/0155029 A1* | 6/2008 | Helbling | H04L 12/18 709/206 |
| 2008/0165944 A1* | 7/2008 | Rosenthal | H04M 3/56 379/202.01 |
| 2008/0226050 A1* | 9/2008 | Leppisaari | G06Q 10/10 379/202.01 |
| 2009/0005038 A1* | 1/2009 | Yasrebi | H04L 65/1069 455/435.1 |
| 2009/0006555 A1* | 1/2009 | Curran | H04M 7/0045 709/206 |
| 2009/0086957 A1* | 4/2009 | Kelley | H04M 3/5232 379/265.09 |
| 2009/0168985 A1* | 7/2009 | Yu | H04L 65/1069 379/202.01 |
| 2009/0177974 A1* | 7/2009 | Cox | H04L 12/1818 715/747 |
| 2010/0061538 A1* | 3/2010 | Coleman | H04M 3/56 379/202.01 |
| 2010/0189238 A1* | 7/2010 | Gupta | H04M 3/56 379/202.01 |
| 2010/0220634 A1* | 9/2010 | Gisby | H04L 12/1818 370/261 |
| 2010/0221693 A1* | 9/2010 | Gupta | G09B 5/14 434/362 |
| 2010/0251140 A1* | 9/2010 | Tipirneni | G06F 3/011 715/753 |
| 2011/0033035 A1* | 2/2011 | Turner | H04M 7/0009 379/202.01 |
| 2011/0185288 A1* | 7/2011 | Gupta | H04L 65/4053 715/752 |
| 2011/0228922 A1* | 9/2011 | Dhara | H04M 3/565 379/202.01 |
| 2011/0271206 A1* | 11/2011 | Jones | G06F 3/0486 715/753 |
| 2012/0114113 A1 | 5/2012 | Zhao | |
| 2012/0185291 A1* | 7/2012 | Ramaswamy | G06Q 10/1095 705/7.19 |
| 2012/0207296 A1* | 8/2012 | George | H04M 3/4234 379/204.01 |
| 2012/0263168 A1* | 10/2012 | Petrack | H04L 12/1818 370/352 |
| 2012/0281823 A1* | 11/2012 | Colbert | H04M 3/563 379/202.01 |
| 2012/0331401 A1* | 12/2012 | Tipirneni | G06F 16/951 715/753 |
| 2013/0179518 A1* | 7/2013 | Quan | H04L 41/026 709/206 |
| 2014/0029474 A1* | 1/2014 | Bhagavatula | H04L 12/1827 370/260 |
| 2014/0036733 A1* | 2/2014 | Teng | G06Q 10/109 370/260 |
| 2014/0185492 A1* | 7/2014 | Liu | H04M 3/00 370/260 |
| 2014/0226537 A1* | 8/2014 | Kashimba | H04L 65/1069 370/261 |
| 2014/0270129 A1* | 9/2014 | Bracken | H04M 3/565 379/202.01 |
| 2015/0046597 A1* | 2/2015 | Dolph | H04L 65/1093 709/227 |
| 2015/0092616 A1* | 4/2015 | Ristock | H04L 12/1818 370/260 |
| 2015/0103136 A1* | 4/2015 | Anderson | H04N 7/155 348/14.09 |
| 2015/0163066 A1* | 6/2015 | DeRosa | H04L 12/1818 370/250 |
| 2015/0326731 A1* | 11/2015 | Laasik | H04L 65/1069 370/352 |
| 2015/0365485 A1* | 12/2015 | Poikselka | H04L 65/4038 709/204 |
| 2016/0014277 A1* | 1/2016 | Tichauer | H04L 65/4053 370/260 |
| 2016/0094716 A1* | 3/2016 | Caulfield | H04W 4/16 455/416 |
| 2016/0095141 A1* | 3/2016 | Ma | H04N 7/15 455/416 |
| 2016/0274855 A1* | 9/2016 | Miki | G06F 3/1454 |
| 2016/0307165 A1* | 10/2016 | Grodum | G06Q 10/1095 |
| 2017/0208130 A1* | 7/2017 | Milton | H04L 67/141 |

FOREIGN PATENT DOCUMENTS

| | | |
|---|---|---|
| CN | 102413072 A | 4/2012 |
| CN | 102763401 A | 10/2012 |
| CN | 104603769 A | 5/2015 |
| CN | 105120365 A | 12/2015 |
| CN | 105407315 A | 3/2016 |
| WO | WO 2011/067521 A1 | 6/2011 |

OTHER PUBLICATIONS

Office Action and Search report of Chinese application 2017100515868 dated Mar. 4, 2021, 6 pages.

* cited by examiner

METHOD, DEVICE, AND SYSTEM FOR FACILITATING GROUP CONFERENCE COMMUNICATION

RELATED APPLICATION

This application is a continuation application of PCT Patent Application No. PCT/CN2018/071888, filed on Jan. 9, 2018, which claims priority to Chinese Patent Application No. 201710051586.8, filed with the China National Intellectual Property Administration on Jan. 23, 2017, both of which are incorporated herein by reference in their entireties.

FIELD OF THE TECHNOLOGY

This application relates to the field of communications technologies, and in particular, to a conferencing communication method, a server, an intelligent terminal, and a computer readable storage medium.

BACKGROUND OF THE DISCLOSURE

Currently, users can conduct a telephone conference by using telephones as mediums, to implement a remote conference. For example, each user may dial a fixed telephone number, and enter a conference password after being connected, and a multi-party telephone conference can be established after the authentication succeeds. In this way, the user can conduct a remote conference with another user based on a telephone voice call by using a telephone terminal.

However, for the current remote conference in the form of a telephone conference, because each user needs to dial a fixed telephone number and enter a conference password to attend the remote conference, operations are complex and efficiency of implementing the remote conference is low.

SUMMARY

A conferencing communication method, a server, an intelligent terminal, and a computer readable storage medium are provided according to various embodiments of this application.

The present disclosure describes a method for performing conference communication. The method includes sending, by a server, a protocol string to an intelligent terminal, so that the intelligent terminal invokes an instant messaging (IM) client according to the protocol string. The server includes a memory storing instructions and a processor in communication with the memory. The protocol string includes an attendance credential. The method includes receiving, by the server, an IM user identifier that has logged in and that is sent by the IM client and the attendance credential. The method also includes adding, by the server the IM user identifier to an IM user group corresponding to the attendance credential. The method further includes establishing, by the server, an Internet channel based on the IM user group, the Internet channel being used for transmitting communication data of a member in the IM user group.

The present disclosure also describes a server for performing conference communication. The server includes a memory storing instructions; and a processor in communication with the memory. When the processor executes the instructions, the processor is configured to cause the server to send a protocol string to an intelligent terminal, so that the intelligent terminal invokes an instant messaging (IM) client according to the protocol string. When the processor executes the instructions, the processor is configured to cause the server to receive an IM user identifier that has logged in and that is sent by the IM client and an attendance credential comprised in the protocol string. When the processor executes the instructions, the processor is also configured to cause the server to add the IM user identifier to an IM user group corresponding to the attendance credential. When the processor executes the instructions, the processor is further configured to cause the server to establish an Internet channel based on the IM user group, the Internet channel being used for transmitting communication data of a member in the IM user group.

The present disclosure further describes a non-transitory computer readable storage medium. The non-transitory computer readable storage medium stores computer readable instructions. When the computer readable instructions are executed by a processor, the computer readable instructions cause the processor to perform sending a protocol string to an intelligent terminal, so that the intelligent terminal invokes an instant messaging (IM) client according to the protocol string comprising an attendance credential. When the computer readable instructions are executed by a processor, the computer readable instructions cause the processor to perform receiving an IM user identifier that has logged in and that is sent by the IM client and the attendance credential. When the computer readable instructions are executed by a processor, the computer readable instructions also cause the processor to perform adding the IM user identifier to an IM user group corresponding to the attendance credential. When the computer readable instructions are executed by a processor, the computer readable instructions further cause the processor to perform establishing an Internet channel based on the IM user group, the Internet channel being used for transmitting communication data of a member in the IM user group.

Details of one or more embodiments of this application are provided in the following accompanying drawings and descriptions. Other features, objectives, and advantages of this application become clearer from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely exemplary embodiments of this application, and a person of ordinary skill in the art may still derive other drawings from these accompanying drawings without creative efforts.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used as examples, instead of limiting this application.

Figure 1:
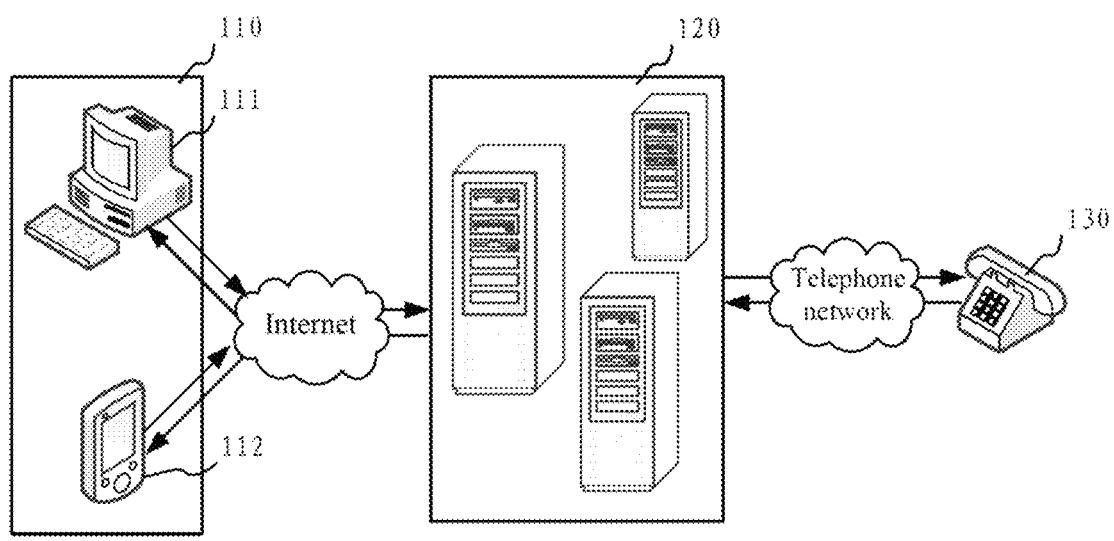
FIG. 1 is a diagram of an application environment for a conferencing communication method according to an embodiment.
Figure 2:
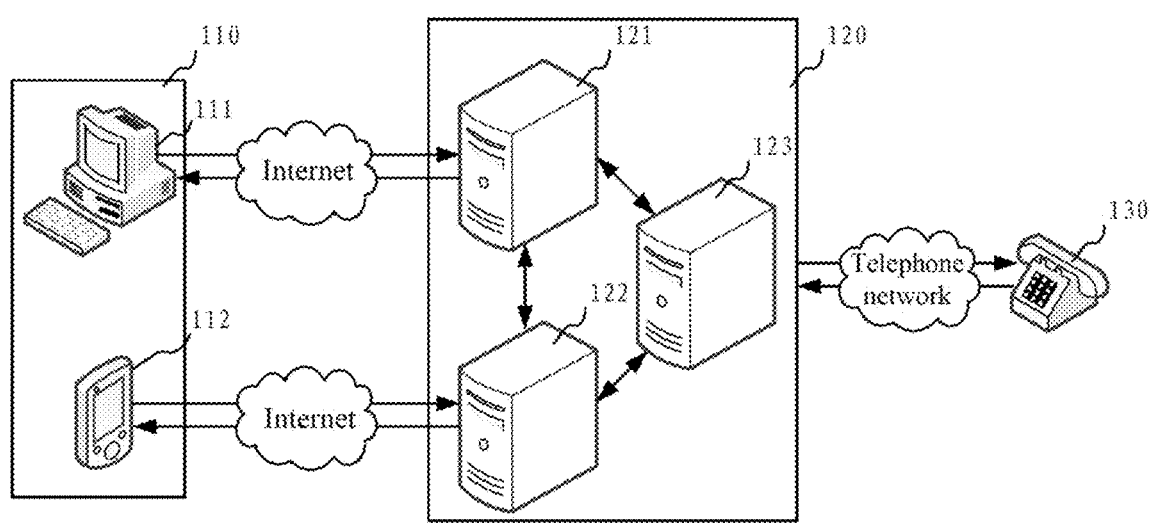
FIG. 2 is a diagram of an application environment for a conferencing communication method according to another embodiment.

FIG. 1 is a diagram of an application environment for a conferencing communication method according to an embodiment. Referring to FIG. 1, the conferencing communication method is applied to a conferencing communications system shown in FIG. 1. The conferencing communications system includes an intelligent terminal 110, a server 120 connected to the intelligent terminal 110, and a telephone terminal (or a telephone terminal) 130 connected to the server 120. The intelligent terminal 110 is a terminal on which an application program can be run, and specifically an instant messaging client can be run. The instant messaging client is an application program that can perform instant messaging. The intelligent terminal 110 may be a personal computer 111 or a mobile terminal 112. The mobile terminal 112 includes at least one of a mobile phone, a tablet computer, a personal digital assistant, a wearable device, or the like. The telephone terminal 130 is a terminal that can access a telephone network, and may be a conventional desk telephone set, or may be a mobile phone, a wireless indoor telephone set, or the like. Further, referring to FIG. 2, in an embodiment, the server 120 may specifically include a conference scheduling server 121, a user group server 122, and a conference control server 123.

Figure 3:
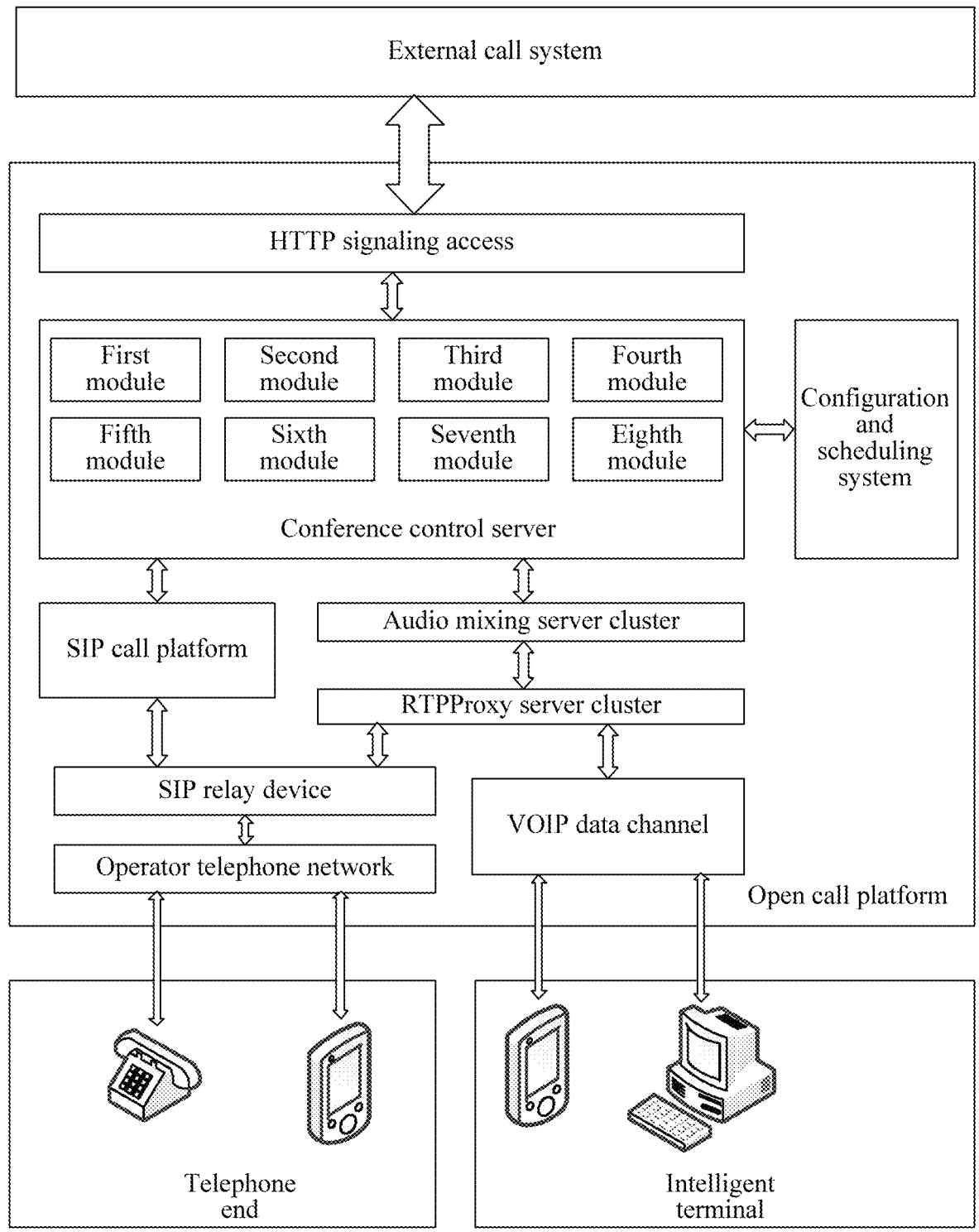
FIG. 3 is a diagram of an environment for a conference control server according to an embodiment.

FIG. 3 is a diagram of an environment for the conference control server 123 according to an embodiment. Referring to FIG. 3, an external call system accesses the conference control server 123 by using HyperText Transfer Protocol (HTTP) signaling. A telephone terminal may separately access a Real-Time Transport Protocol proxy (RTPProxy) server cluster and an SIP call platform by successively using an operator telephone network and a Session Initiation Protocol (SIP) relay device. The SIP call platform accesses the conference control server 123. The RTPProxy server cluster accesses the conference control server 123 by using an audio mixing server cluster. The intelligent terminal accesses the RTPProxy server cluster by using a Voice over Internet Protocol (VOIP) data channel.

The conference control server 123 includes a first module, a second module, a third module, a fourth module, a fifth module, a sixth module, a seventh module, and an eighth module. The first module is configured to assign a conference number. The first module may assign a conference number in response to a conference scheduling request of the conference scheduling server.

The second module is configured to allocate resources such as a call platform, an RTPProxy server, and an audio mixing server. Specifically, before inviting a telephone terminal member, the second module allocates corresponding resources such as the SIP call platform, the SIP relay device, the RTPProxy server, and the audio mixing server according to configuration and scheduling of a configuration and scheduling system, to prepare for inviting the member.

The third module is configured to invite the member to join a conference. The third module is configured to: add the invited member to an allocated resource, and prepare a related resource for subsequently receiving and processing communication data of the member. When inviting the telephone terminal member, the third module may be configured to deliver invitation signaling to an allocated call platform. The SIP call platform initiates a call request according to the invitation signaling, sends the call request to the operator telephone network by using the SIP relay device, and sends the call request to the telephone terminal by using the operator telephone network. After the telephone terminal is gotten through to, the invitation is completed.

The fourth module is configured to manage statuses of the conference and the member. The fourth module may store the status of the conference and the status of the member in a storage system, and may sense a status, such as answering, hangup, or a data stream state, of each member in time through interaction with the SIP call platform and the RTPProxy server. The fourth module may be configured to receive a query request of an external system, to query for the statuses of the conference and the member.

The fifth module is configured to control playback of an interactive voice response (IVR). The IVR includes a welcome speech, an input prompt, guidance in time of an input error, and the like. After the telephone terminal dials an attendance switchboard number, the fifth module may be configured to play an IVR recorded in advance, to guide a user on entering a conference number. The fifth module may be configured to provide a function of customizing an IVR.

The sixth module is configured to process keypad data of the telephone terminal. The telephone terminal member may actively dial the attendance switchboard number, and enter the conference number to attend the conference. After getting through to the attendance switchboard number, the telephone terminal has not joined the conference but already established a telephone network channel between the conference control server and the operator telephone network. The telephone terminal sends an event type and a key value in a form of a dual tone multi frequency (DTMF) data packet to the SIP relay device through the telephone network channel. The SIP relay device sends the DTMF data packet to the RTPProxy server, and the RTPProxy server forwards the DTMF data packet to the conference control server. The conference control server obtains the event type and the key value from the DTMF data packet, and when the event type indicates an event type of entering the conference number, combines a corresponding key value to obtain the conference number. In addition to entering the conference number, the sixth module may be further used for key interaction with the telephone terminal member in another scenario.

The seventh module is configured to operate the storage system in which the statuses of the conference and the member are stored.

The eighth module is configured to: notify a change of the member status and notify a bill. For the change of the member status, such as the answering or the hangup, of the telephone terminal member, the eighth module is configured to report the change of the member status to the external call system, so that the external call system can sense the change of the member status in real time. In addition, the eighth module may report, to the external call system, a bill generated after a call ends. The bill may include member information such as the invitation, the answering, and the hangup.

Figure 4:
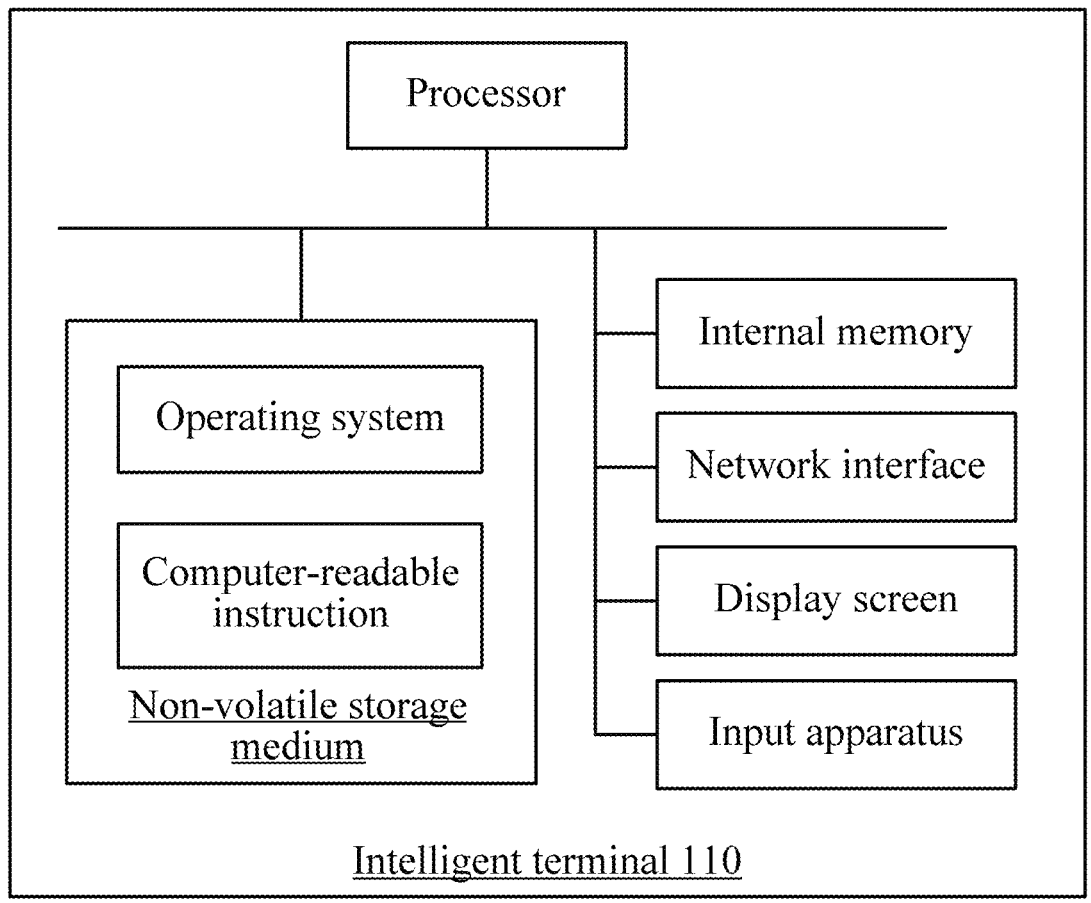
FIG. 4 is a schematic diagram of an internal structure of an intelligent terminal according to an embodiment.

FIG. 4 is a schematic diagram of an internal structure of the intelligent terminal 110 according to an embodiment. Referring to FIG. 4, the intelligent terminal 110 includes a processor, a memory, a network interface, a display screen, and an input apparatus that are connected by using a system bus. The memory includes a non-volatile storage medium and an internal memory. The non-volatile storage medium of the intelligent terminal stores an operating system, and may further store a computer-readable instruction. When the computer-readable instruction is executed by the processor, the processor may be caused to perform the conferencing communication method. The internal memory may also store a computer-readable instruction, and when the computer-readable instruction is executed by the processor, the processor may be caused to perform the conferencing communication method. The network interface of the intelligent terminal 110 is configured to perform network communication with the server 120, for example, transmit communication data of a member in an instant messaging user group. The display screen of the intelligent terminal 110 may be a liquid crystal display screen or an e-ink display screen. The input apparatus of the intelligent terminal 110 may be a touch layer covering the display screen, or may be a button, a trackball, or a touchpad disposed on the intelligent terminal 110, or may be an external keyboard, touchpad, a mouse or the like. A person skilled in the art may understand that, the structure shown in FIG. 4 is merely a block diagram of a partial structure related to a solution of this application, and does not constitute any limitation on the intelligent terminal 110 to which the solution of this application is applied. The intelligent terminal 110 may specifically include more or fewer components than those shown in the figure, or some components may be combined, or a different component deployment may be used.

Figure 5:
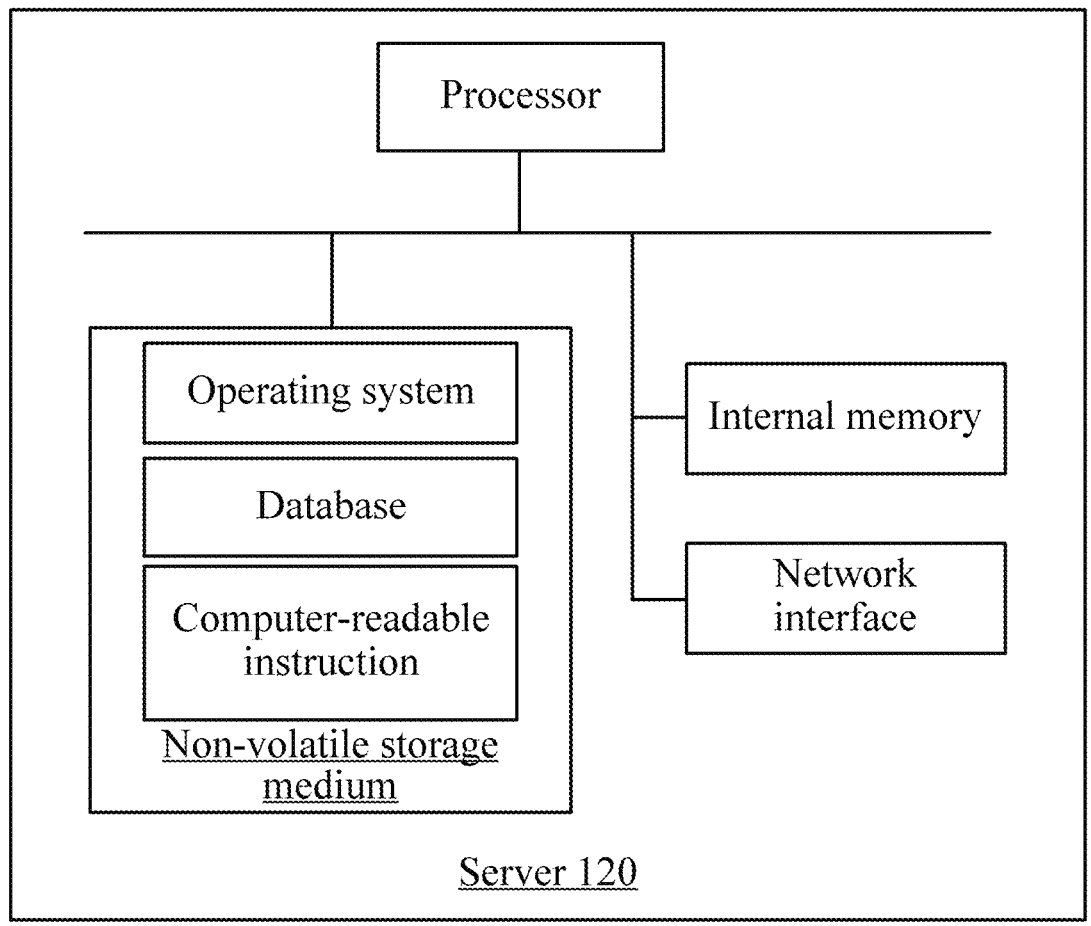
FIG. 5 is a schematic diagram of an internal structure of a server according to an embodiment.

FIG. 5 is a schematic diagram of an internal structure of the server 120 according to an embodiment. Referring to FIG. 5, the server 120 includes a processor, a memory, and a network interface connected by using a system bus. The memory includes a non-volatile storage medium and an internal memory. The non-volatile storage medium of the server stores an operating system, and may further store a computer-readable instruction. When the computer-readable instruction is executed by the processor, the processor may be caused to perform the conferencing communication method. The non-volatile storage medium of the server may further store a database, and the database may store information about an instant messaging user group. The internal memory may also store a computer-readable instruction, and when the computer-readable instruction is executed by the processor, the processor may be caused to perform the conferencing communication method. The network interface of the server 120 is configured to perform network communication with the outside world. The server 120 may be implemented by using an independent server or a server cluster that includes a plurality of servers. A person skilled in the art may understand that, the structure shown in FIG. 5 is merely a block diagram of a partial structure related to a solution of this application, and does not constitute any limitation on the server 120 to which the solution of this application is applied. The server 120 may specifically include more or fewer components than those shown in the figure, or some components may be combined, or a different component deployment may be used.

Figure 6:
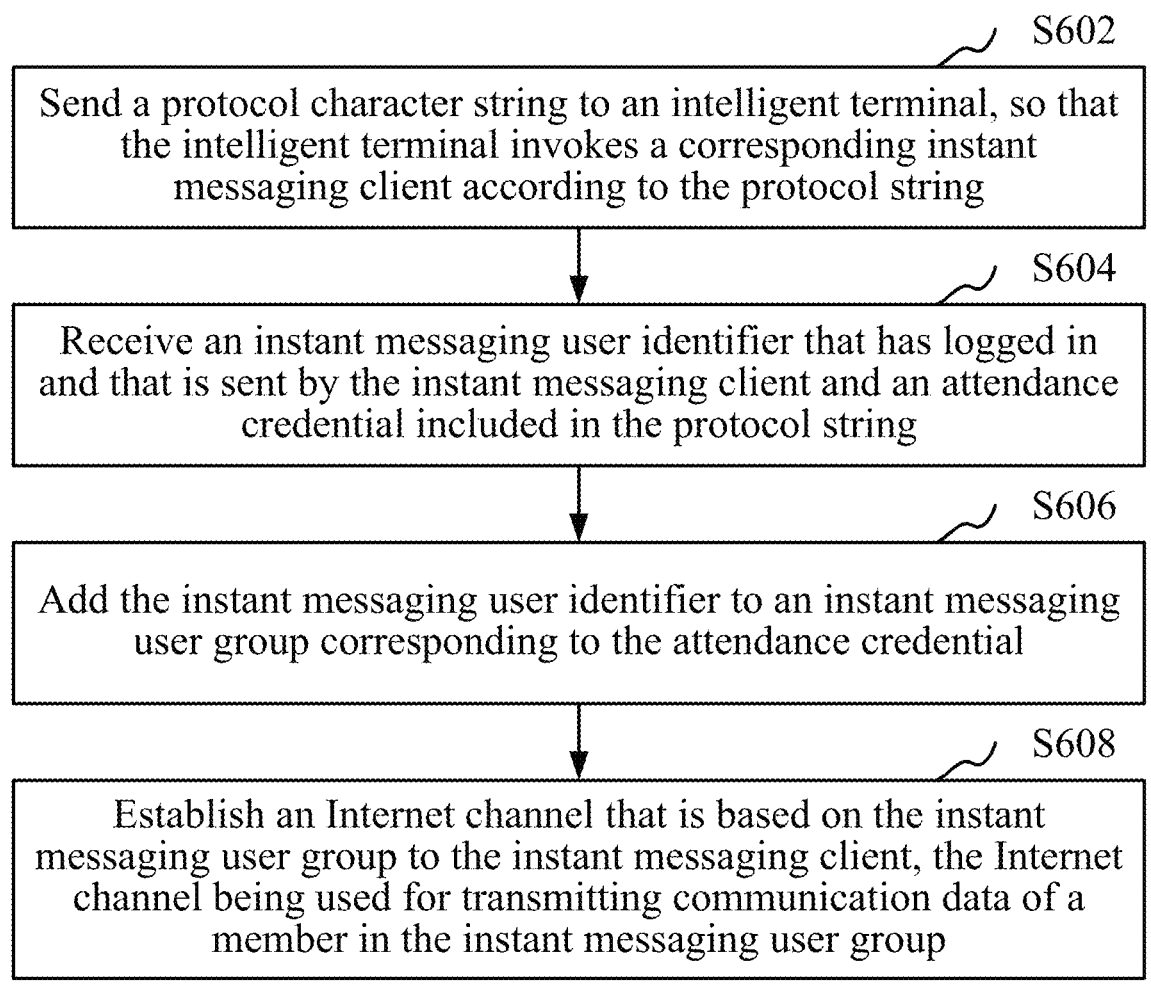
FIG. 6 is a schematic flowchart of a conferencing communication method according to an embodiment.

FIG. 6 is a schematic flowchart of a conferencing communication method according to an embodiment. This embodiment is described mainly by using an example in which the method is applied to the server 120 in FIG. 1, and is specifically described by using an example in which the method is applied to the conference scheduling server 121, the user group server 122, and the conference control server 123 in FIG. 2. Referring to FIG. 6, the conferencing communication method specifically includes the following steps:

S602: Send a protocol string to an intelligent terminal, so that the intelligent terminal invokes a corresponding instant messaging client according to the protocol string.

The protocol string may include a character string that complies with a preset protocol. The protocol string may be generated according to the preset protocol, and may be parsed by using the preset protocol as a basis, to obtain a corresponding instruction.

The protocol string may include a protocol identifier and an attendance credential. The protocol identifier is used for uniquely identifying the corresponding preset protocol. The attendance credential is in a one-to-one correspondence with an instant messaging user group, is used for joining an allocated instant messaging user group, and may uniquely identify the instant messaging user group.

The protocol string may include an attendance switchboard number and a conference number. The attendance switchboard number may be used for initiating a call for a connection to the conference control server, and joining the instant messaging user group after the conference number is entered, to join a conference.

The protocol string may include an instant messaging user group number. The instant messaging user group number is a number of the instant messaging user group. The instant messaging user group is a user set that can accommodate many people for performing instant messaging. The instant messaging user group may be long-standing, for example, an instant messaging group; or may be temporary, for example, a discussion group.

A temporary instant messaging user group means that the instant messaging user group has a validity condition, and the instant messaging user group is dissolved when the validity condition is not satisfied. For example, the validity condition is a validity period condition or a user activeness condition. For the temporary instant messaging user group, an instant messaging user group number is recycled, and may be not unique in some cases.

The protocol string may vary with an operating system used on the intelligent terminal, and the corresponding instant messaging client that is invoked may also vary. For example, different preset protocols are respectively used and different protocol strings are generated in the Microsoft Windows operating system and the Android operating system. Different instant messaging clients may specifically be instant messaging clients of different versions respectively developed for different operating systems, or may be instant messaging clients of different types.

For example, the protocol string may be: "myticket://XXX/mt?src_type=web&version=1.0&ticket=ajAoIg&title=12345&num1=123456&num2=123456789&num3=1234567&start=1". myticket indicates a protocol identifier; XXX/mt indicates a conference service; src_type=web indicates that a source of the protocol string is a network; version=1.0 indicates a protocol version number; ticket=ajAoIg indicates that the attendance credential is ajAoIg; title=12345 indicates a conference title, namely, a conference name; num1=123456 indicates that the conference number is 123456; num2=123456789 indicates that the attendance switchboard number is 123456789; num3=1234567 indicates that the instant messaging user group number is 1234567; and start=1 indicates that the instant messaging client is started in an audio manner.

The instant messaging client is an application program that can instantly send and receive an Internet message. The instant messaging client is capable of processing communication data, and the communication data may include audio call data, video call data, or any other types of communication data.

In an embodiment, after receiving a conference scheduling request, the conference scheduling server may process the conference scheduling request, to generate a protocol string and complete conference scheduling, and send the protocol string to the intelligent terminal. The intelligent terminal that receives the protocol string may specifically be an intelligent terminal that initiates the conference scheduling request, or may be an intelligent terminal corresponding to a conference attendee specified by the conference scheduling request.

In an embodiment, step S602 includes: receiving an access request initiated by the intelligent terminal according to a conference link, querying, according to the access request, for a protocol string to which the conference link is mapped, and sending the protocol string to the intelligent terminal, so that the intelligent terminal invokes a corresponding instant messaging client according to the protocol string. The conference link is in a one-to-one correspondence with the protocol string. The conference link may have a validity period, for example, within 24 hours after an end time of a conference time.

In an embodiment, before step S602, the method further includes: receiving an access request initiated by the intelligent terminal according to a conference link, obtaining a mapping character string and an operating system identifier carried in the access request, mapping the mapping character string to a protocol string corresponding to the operating system identifier, and sending the protocol string to the intelligent terminal, so that the intelligent terminal invokes a corresponding instant messaging client according to the protocol string. The access request may be initiated by a browser on the intelligent terminal, and a User Agent field in the access request may indicate the operating system identifier.

For example, it is assumed that, the conference link is https://x.x.cn/s/abcDEF, where https://x.x.cn/s is used for identifying an address of a server that maps the conference link; and abcDEF is a mapping character string.

In an embodiment, after receiving a protocol string delivered by the server, the intelligent terminal identifies the protocol string by using a corresponding item registered in the operating system by the instant messaging client or by using a plug-in installed in a browser, thereby invoking a corresponding instant messaging client according to the protocol string.

S604: Receive an instant messaging user identifier that has logged in and that is sent by the instant messaging client and an attendance credential included in the protocol string.

The attendance credential is a credential for joining the instant messaging user group to attend the conference. The attendance credential may be an encrypted character string. The instant messaging user identifier is an identifier of a user that has logged in to the instant messaging client. The instant messaging user identifier that has logged in is an instant messaging user identifier used on the intelligent terminal to log in to the instant messaging client.

In an embodiment, after invoking the instant messaging client, the intelligent terminal obtains, by using the instant messaging client, an instant messaging user identifier that has logged in and an attendance credential obtained by parsing the protocol string, thereby sending the instant messaging user identifier and the attendance credential to the user group server.

S606: Add the instant messaging user identifier to an instant messaging user group corresponding to the attendance credential.

In an embodiment, the user group server may check a received attendance credential, and query for an instant messaging user group corresponding to the attendance credential after the check succeeds, thereby adding the received instant messaging user identifier as a member to the found instant messaging user group.

In an embodiment, the user group server may further receive an instant messaging user group number that is included in a protocol string and that is sent by the instant messaging client, and when an attendance credential and the instant messaging user group number correspond to a same instant messaging user group, add an instant messaging user identifier as a member to the instant messaging user group corresponding to the attendance credential.

S608: Establish an Internet channel that is based on the instant messaging user group to the instant messaging client, the Internet channel being used for transmitting communication data of a member in the instant messaging user group.

The Internet channel that is based on the instant messaging user group is an Internet channel established according to members in the instant messaging user group, so that the members in the instant messaging user group can communicate with each other. The Internet channel is a channel for transmitting data by using the Internet.

It is assumed that the instant messaging user group includes N members. The user group server may obtain communication data corresponding to N−1 members corresponding to the instant messaging user group, and transmit the communication data to an instant messaging client corresponding to the remaining one member. The user group server may alternatively obtain communication data transmitted by an instant messaging client corresponding to one member in the instant messaging user group, and transmit the communication data by using a channel corresponding to the remaining N−1 members. The communication data may be data that is obtained by performing audio mixing on voice call data of a plurality of channels.

According to the foregoing conferencing communication method, the instant messaging client may be automatically invoked by using the protocol string, so that the instant messaging user identifier and the attendance credential that is included in the protocol string can be directly obtained by using the instant messaging client, and the Internet channel that is based on the instant messaging user group is established according to the instant messaging user identifier and the attendance credential. A remote conference may be implemented by transmitting the communication data of the member in the instant messaging user group through the Internet channel. Compared with a current remote conference in a telephone conference form, a fixed telephone number does not need to be manually dialed, nor does a conference password need to be manually entered, simplifying an operation, and improving efficiency of implementing the remote conference.

In an embodiment, before step S602, the method further includes: receiving a conference scheduling request; creating an empty instant messaging user group according to the conference scheduling request; generating a protocol string corresponding to the instant messaging user group; mapping the protocol string to a corresponding conference link; and sending the conference link to the intelligent terminal; and step S602 includes: receiving an access request initiated by the intelligent terminal according to the conference link; and feeding back the protocol string to the intelligent terminal according to the access request.

Figure 7:
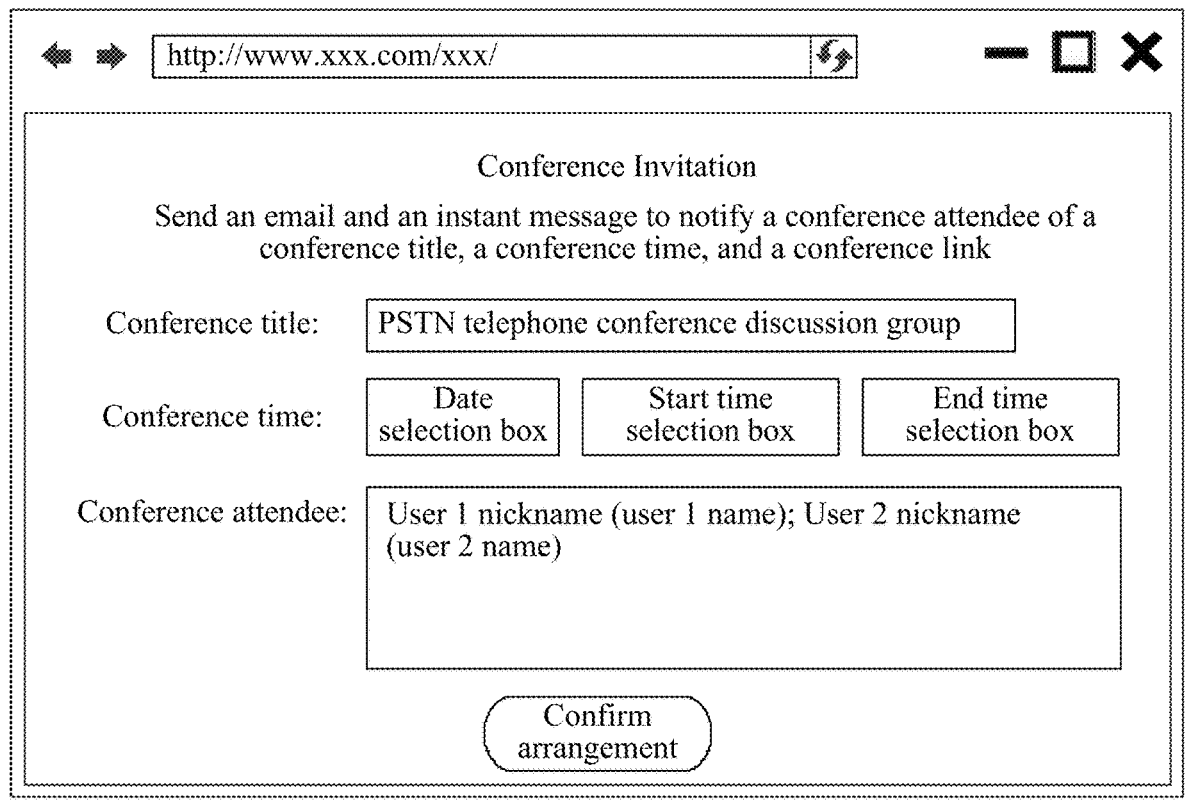
FIG. 7 is a schematic diagram of a web page used for scheduling a conference according to an embodiment.

Specifically, the conference scheduling server may provide a web page that is used for scheduling a conference and that is shown in FIG. 7. The intelligent terminal accesses the web page, enters conference scheduling information such as a conference title, a conference time, and a conference attendee on the web page, generates, after obtaining a confirmation instruction, a conference scheduling request carrying the conference scheduling information, and sends the conference scheduling request to the conference scheduling server.

Figure 8:
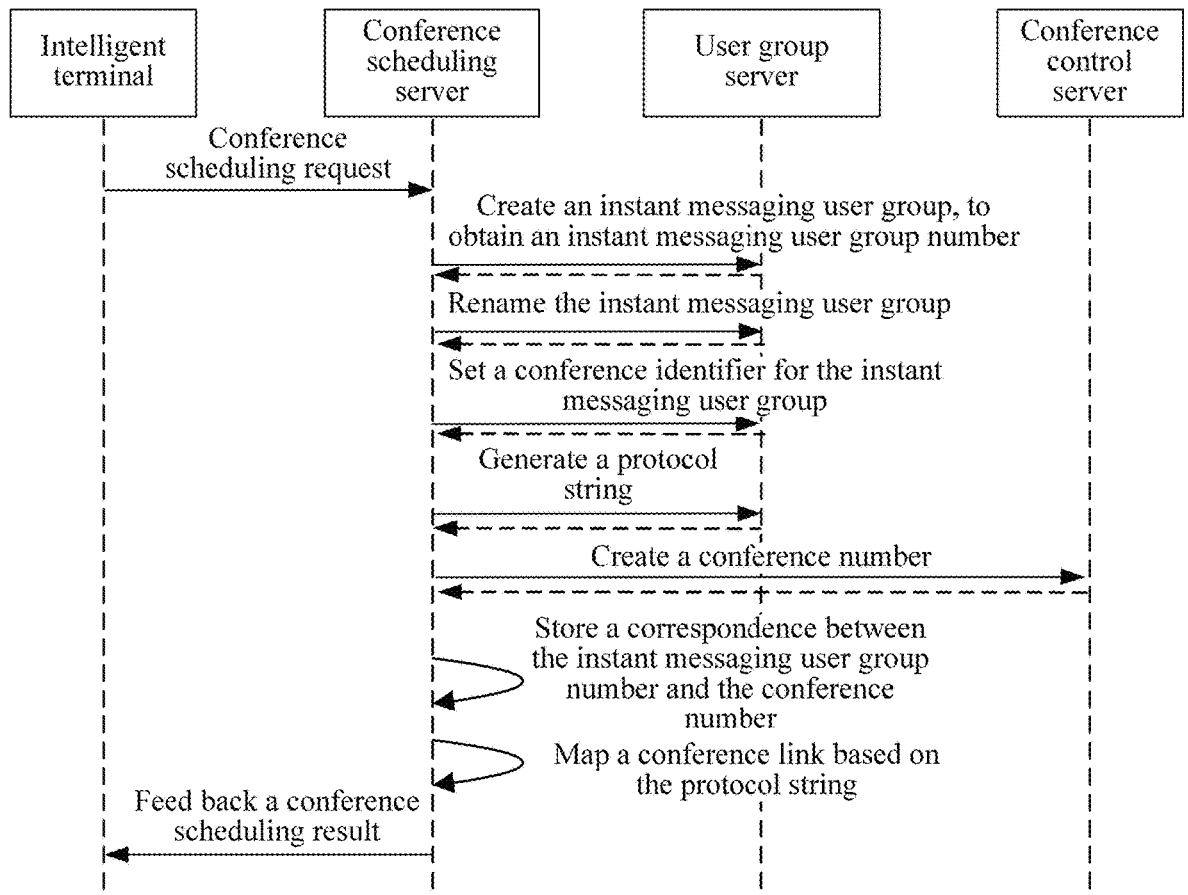
FIG. 8 is a sequence diagram of scheduling a conference according to an embodiment.

In an embodiment, referring to FIG. 8, the conference scheduling server requests the user group server to create an empty instant messaging user group, to obtain a corresponding instant messaging user group number. The conference scheduling server requests the user group server to generate a protocol string corresponding to the instant messaging user group. The conference scheduling server requests the conference control server to create a conference number. The conference scheduling server stores a correspondence between the instant messaging user group number and the conference number. The conference scheduling server maps the protocol string to a corresponding conference link. The conference scheduling server feeds back a conference scheduling result that includes the conference link to the intelligent terminal that initiates the conference scheduling request.

Further, the conference scheduling server may request the user group server to rename the instant messaging user group a conference title. The conference scheduling server may request the user group server to add a conference identifier to the instant messaging user group. The conference identifier is used for identifying a conference purpose for a corresponding instant messaging user group. When a conference is joined, the conference identifier may be used for filtering out an instant messaging user group that is not for the conference purpose, improving efficiency.

Figure 9:
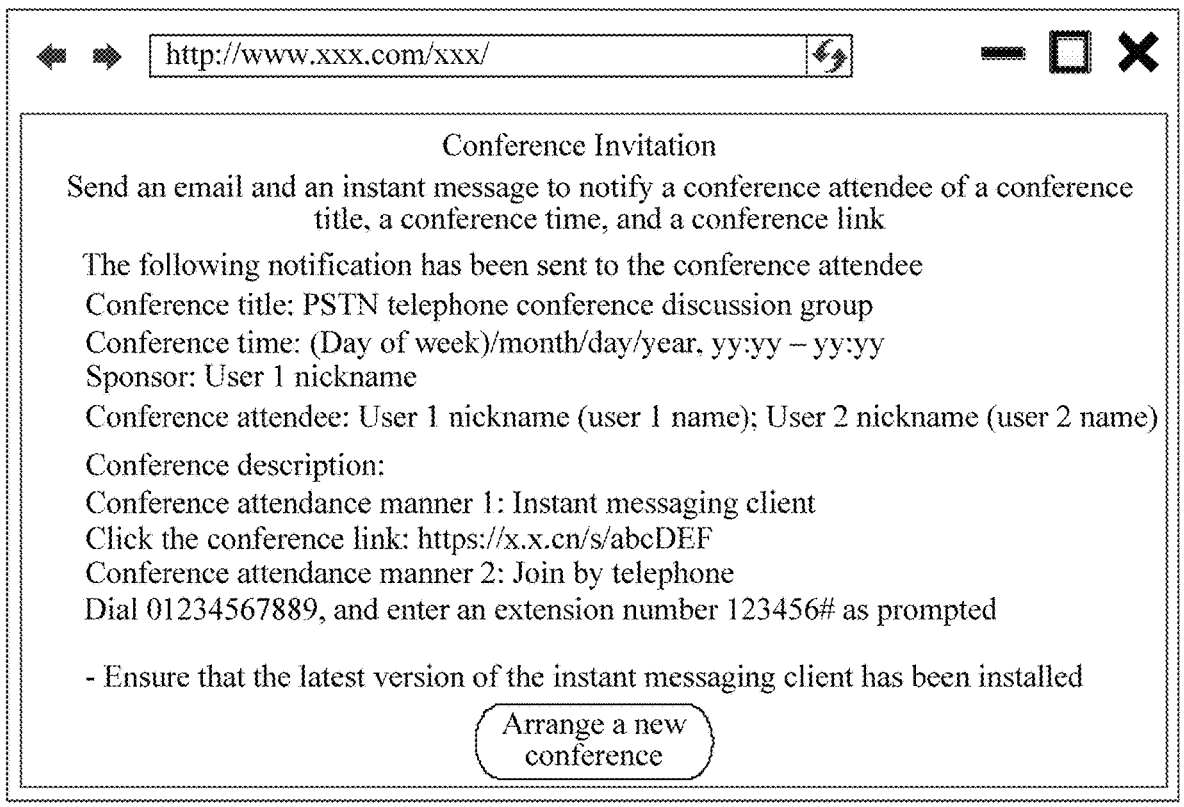
FIG. 9 is a schematic diagram of a web page used for displaying a conference scheduling result according to an embodiment.
Figure 10:
FIG. 10 is a schematic diagram of a page for presenting a conference scheduling result according to an embodiment.

The conference scheduling result may further include conference scheduling information, and may further include an attendance switchboard number and a conference number that is allocated to this scheduling. After the conference scheduling server feeds back the conference scheduling result to the intelligent terminal that initiates the conference scheduling request, the intelligent terminal may present a web page shown in FIG. 9. The conference scheduling result is displayed on the web page. The conference scheduling server may further push the conference scheduling result in a form of a short message service message or an instant message to an intelligent terminal corresponding to a conference attendee. The intelligent terminal receives and presents the conference scheduling result, as shown in FIG. 10.

In this embodiment, when the conference is scheduled, the empty instant messaging user group is created, and subsequent joining to the conference may be implemented by directly joining the created instant messaging user group, improving efficiency of implementing the remote conference. The protocol string is mapped to the conference link, to prevent the protocol string from being directly exposed, so that security of the protocol string can be ensured to an extent. In addition, the conference link can be directly triggered and accessed by using a browser, and can be supported by each intelligent terminal, improving compatibility.

In an embodiment, the conferencing communication method further includes: receiving a call request that is initiated by a telephone terminal according to an attendance switchboard number; establishing a telephone network channel to the telephone terminal according to the call request; receiving a conference number through the telephone network channel; querying for an instant messaging user group corresponding to the conference number; adding, to the found instant messaging user group, a telephone number that initiates the call request; and enabling the telephone network channel to be connected to the Internet channel.

The telephone network channel is a channel for transmitting a signal by using a telephone network. For example, the telephone network is a public switched telephone network (PSTN).

Figure 11:
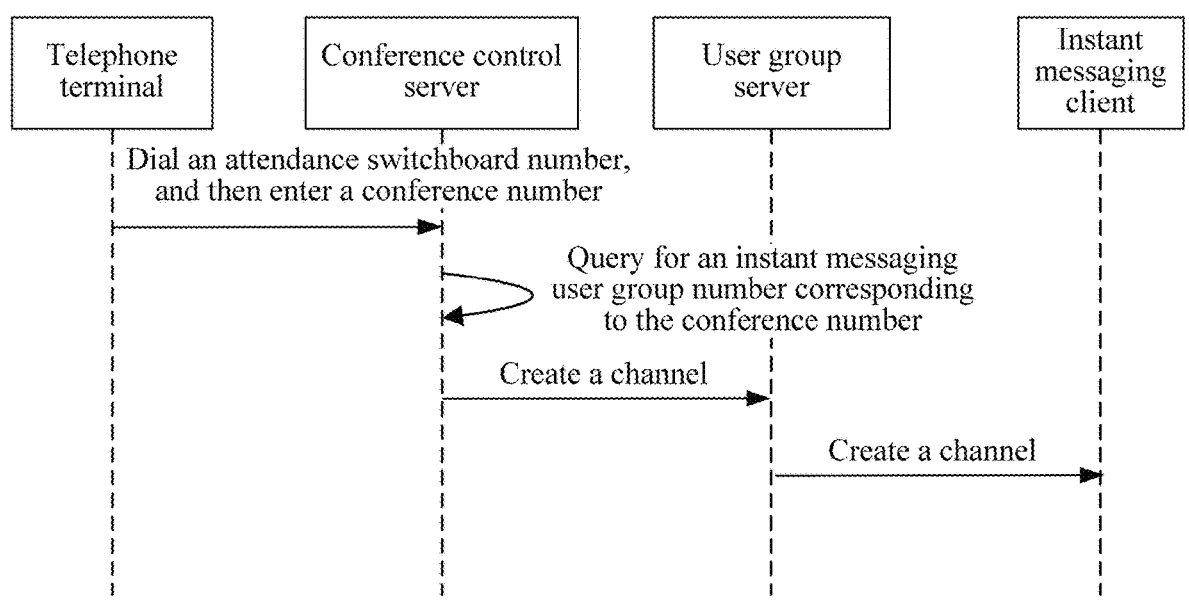
FIG. 11 is a sequence diagram of joining a conference by a telephone terminal according to an embodiment.

Specifically, referring to FIG. 11, the conference control server may receive the call request for dialing the attendance switchboard number, and establish the telephone network channel to the telephone terminal after getting through. The conference control server may receive the conference number that is sent by the telephone terminal through the telephone network channel, and query for an instant messaging user group number corresponding to the conference number, thereby enabling the telephone network channel to be connected to the Internet channel corresponding to the instant messaging user group number.

In an embodiment, after the telephone terminal gets through to the attendance switchboard number, an IVR recorded in advance is played, to prompt a user to enter a conference number. After getting through to the attendance switchboard number, the telephone terminal has not joined the conference but already established a telephone network channel between the conference control server and the operator telephone network. The telephone terminal sends an event type and a key value in a form of a DTMF data packet to the SIP relay device through the telephone network channel. The SIP relay device sends the DTMF data packet to the RTPProxy server, and the RTPProxy server forwards the DTMF data packet to the conference control server. The conference control server obtains the event type and the key value from the DTMF data packet, and when the event type indicates an event type of entering the conference number, combines a corresponding key value to obtain the conference number.

After enabling the telephone network channel to be connected to the Internet channel, the conference control server may control a corresponding audio mixing server to perform audio mixing processing on communication data of each channel in the telephone network channel and the Internet channel, and then send the communication data through another channel in the telephone network channel and the Internet channel, so that each member in the instant messaging user group can clearly hear a call voice of another member.

In this embodiment, based on the instant messaging user group, not only conference communication may be conducted between instant messaging clients, but also a cross-network conference may be conducted between an instant messaging client and a telephone terminal. An instant messaging user and a telephone terminal member can both attend a same remote conference, so that compatibility is high.

In an embodiment, the conferencing communication method further includes: receiving an invitee telephone number sent by the instant messaging client; adding the telephone number to the instant messaging user group; calling a telephone terminal corresponding to the invitee telephone number, and establishing a telephone network channel to the telephone terminal; and enabling the telephone network channel to be connected to the Internet channel.

Figure 12:
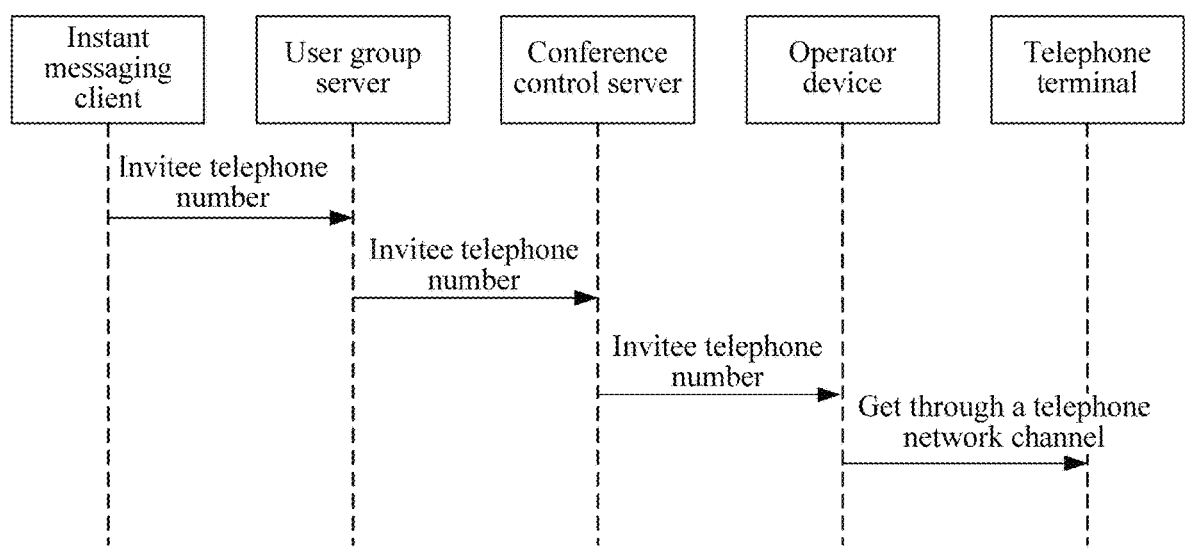
FIG. 12 is a sequence diagram of inviting, by an instant messaging client, a telephone terminal to join a conference according to an embodiment.

Referring to FIG. 12, the instant messaging client obtains the invitee telephone number, and sends the telephone number to the user group server, and the user group server adds the telephone number to the instant messaging user group. The user group server sends the telephone number to the conference control server.

Further, the conference control server generates invitation signaling according to the telephone number, and delivers the invitation signaling to a call platform, and the call platform sends the invitation signaling to the operator telephone network by using the SIP relay device, and sends the call request to the telephone terminal by using the operator telephone network. After the telephone terminal is gotten through to, the invitation is completed, and the telephone network channel is in communication with the Internet channel.

The instant messaging client may obtain a telephone number entered or selected by an instant messaging user, and use the telephone number as the invitee telephone number. The telephone number may be selected from a communication list provided by the instant messaging client, or may be selected from a contact list application program.

In this embodiment, the instant messaging client may actively invite a user of the telephone terminal to attend the conference, and is compatible with more conference attendance forms. In addition, operating the instant messaging client is more convenient than dialing a telephone, so that remote conference attendance can be more timely and convenient.

In an embodiment, the conferencing communication method further includes: receiving a keypad data packet sent by the telephone terminal through the telephone network channel; parsing the keypad data packet into a key value; querying for information that is about the instant messaging user group and that is corresponding to the key value; generating a voice announcement of the found or queried information; and transmitting the voice announcement to the telephone terminal through the telephone network channel.

Specifically, when detecting the key value in a conference communication process, the telephone terminal generates a corresponding event type, and sends an event type and the key value in a form of a DTMF data packet to the SIP relay device. The SIP relay device sends the DTMF data packet to the RTPProxy server. The RTPProxy server converts the DTMF data packet, to obtain a data packet that can be identified by the conference control server, and forwards the data packet to the conference control server.

The conference control server obtains the event type and the key value from the data packet, and when the event type indicates querying for information about the instant messaging user group, queries for the corresponding information, generates a voice announcement, and sends the voice announcement in the form of the DTMF data packet to the telephone terminal to play, so that the user of the telephone terminal can hear the information about the instant messaging user group. For example, the information about the instant messaging user group includes a name of a member in the instant messaging user group, or a member that does not attend the conference. Different key values may correspond to different information.

In this embodiment, in a conference attendance process, the user of the telephone terminal may trigger a key to listen to the information that is about the instant messaging user group and that is corresponding to the key value, providing a greater interaction capability.

In an embodiment, the conferencing communication method further includes: obtaining a call noise monitoring result of each member in the instant messaging user group; sending the call noise monitoring result to the instant messaging client; receiving a mute instruction sent by the instant messaging client; and performing, according to the mute instruction, mute processing on a member that is in the instant messaging user group and that is targeted by the mute instruction.

Figure 13:
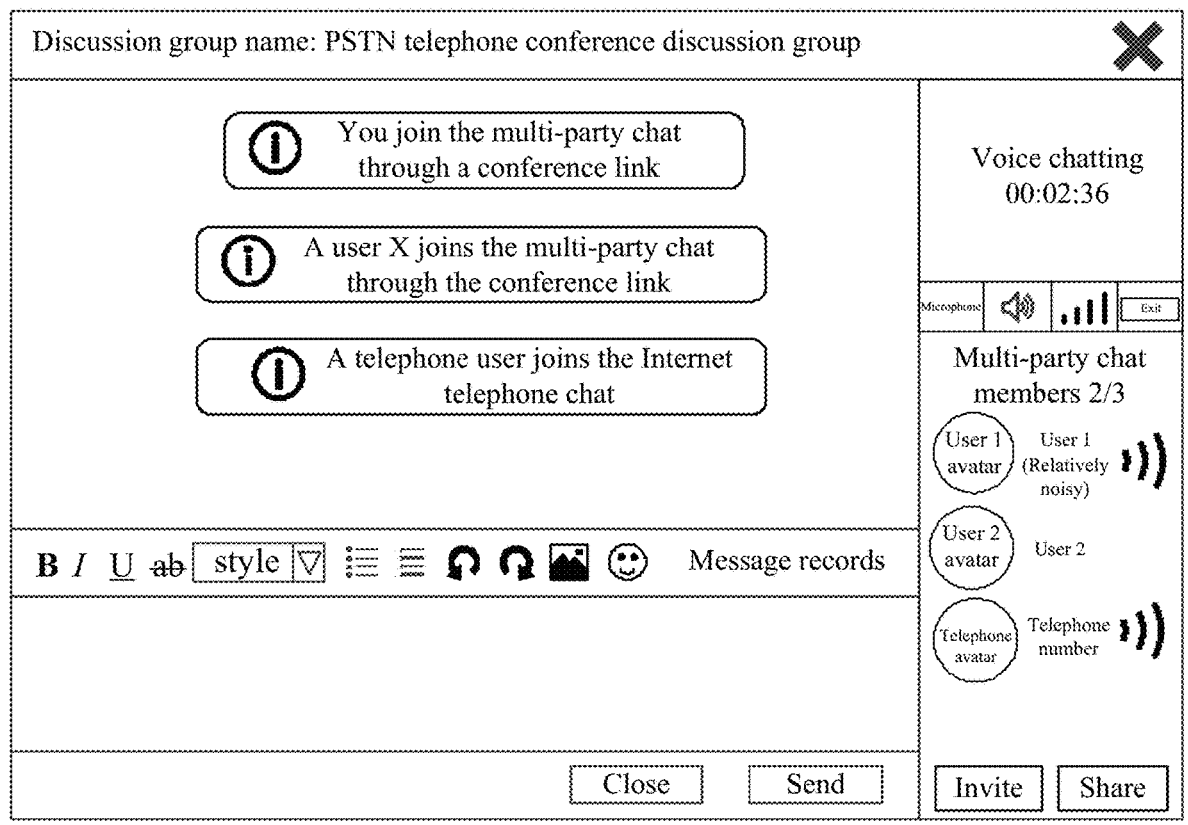
FIG. 13 is a schematic diagram of a conference interface displayed on an instant messaging client according to an embodiment.
Figure 14:
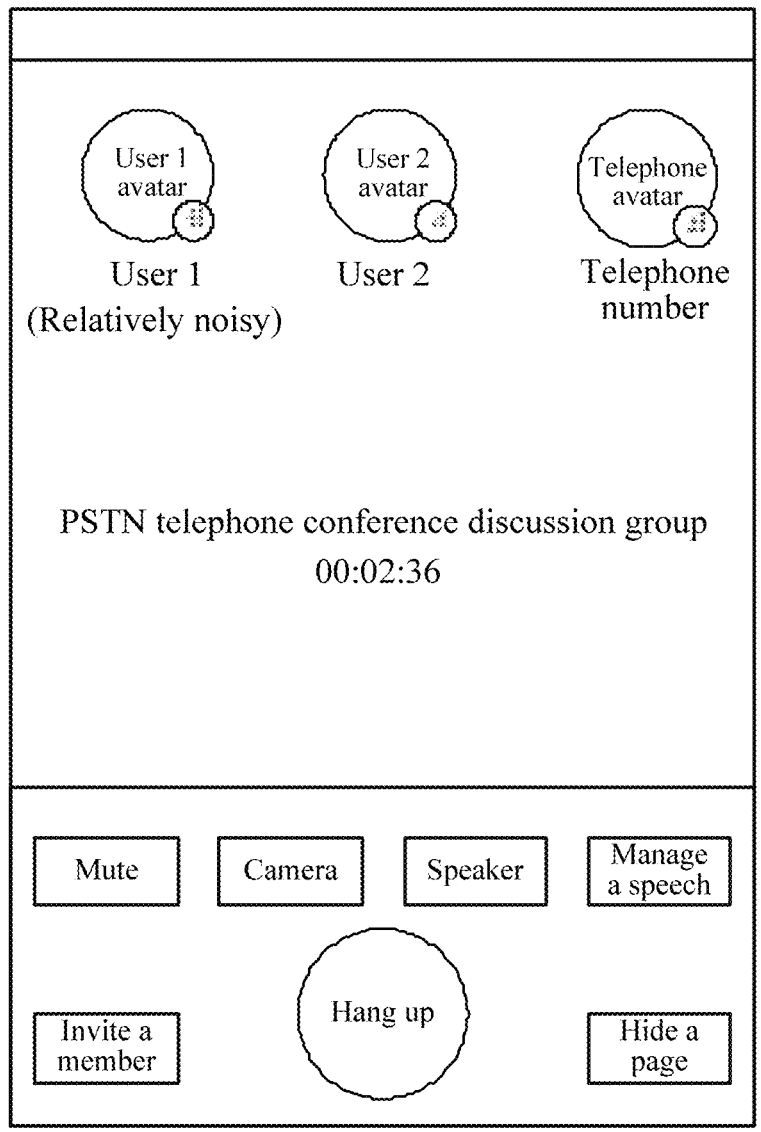
FIG. 14 is a schematic diagram of a conference interface displayed on an instant messaging client according to another embodiment.

Specifically, referring to FIG. 13 and FIG. 14, the conference control server may directly detect a call noise of each member, and send a corresponding call noise monitoring result to the instant messaging client. For a call noise monitoring result that reaches a preset noise level, the instant messaging client may display, in correspondence to information about a corresponding member, a noise mark. The instant messaging client may not display a call noise monitoring result that does not reach the preset noise level. The instant messaging user may directly select one or more members, and trigger the mute instruction, thereby performing mute processing on a corresponding channel. The channel herein may be a telephone network channel or an Internet channel.

In this embodiment, a noise status of each member may be visually presented by using the instant messaging client, so that the mute processing may be performed as required, improving voice quality of a remote conference.

Figure 15:
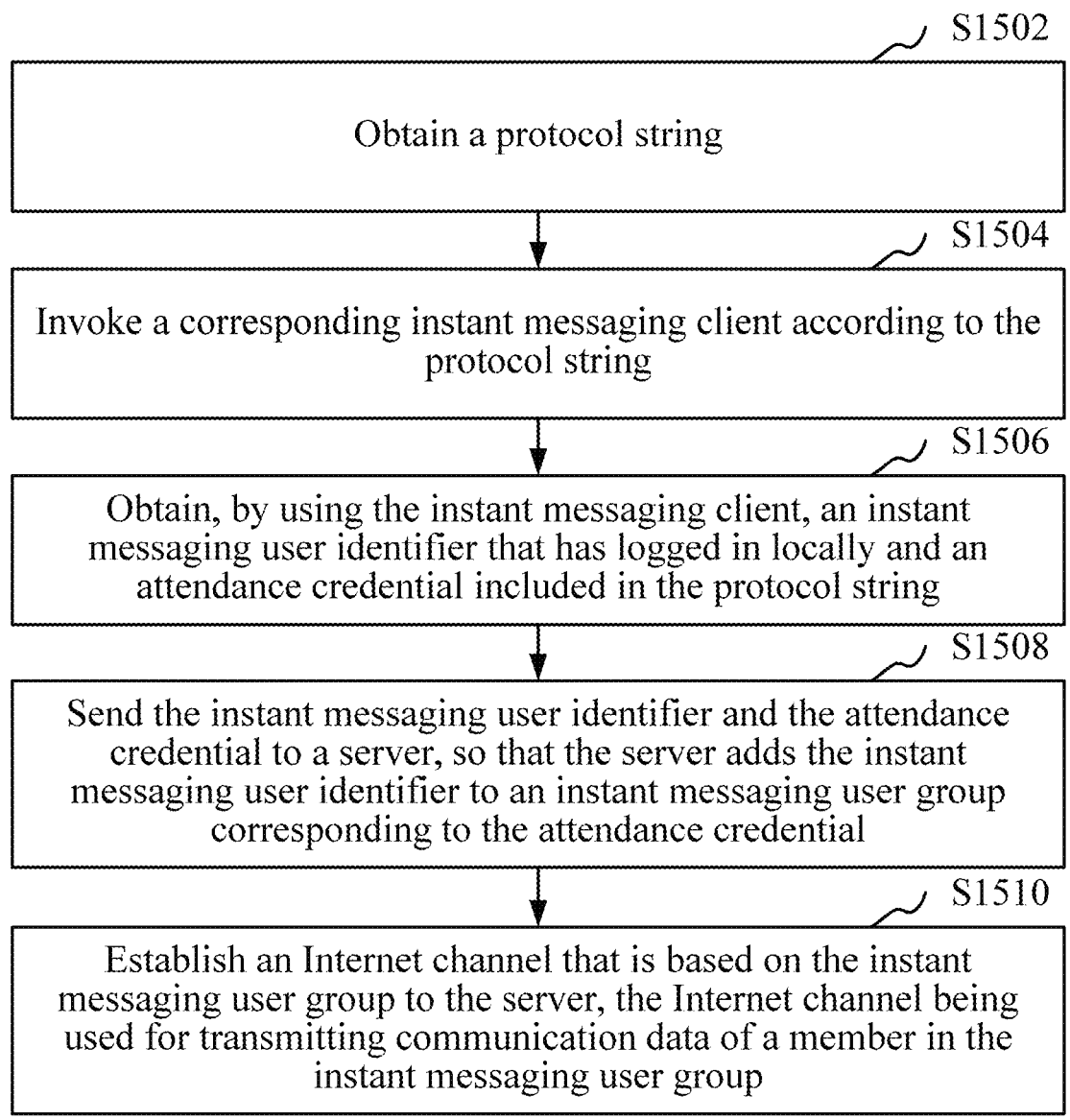
FIG. 15 is a schematic flowchart of a conferencing communication method according to another embodiment.

FIG. 15 is a schematic flowchart of a conferencing communication method according to another embodiment. This embodiment is described mainly by using an example in which the method is applied to the intelligent terminal 110 in FIG. 1. The intelligent terminal 110 in this embodiment performs each step in the conferencing communication method. Refer to the embodiments of the conferencing communication method that is applicable to a server. Referring to FIG. 15, the method specifically includes the following steps:

S1502: Obtain a protocol string.

S1504: Invoke a corresponding instant messaging client according to the protocol string.

S1506: Obtain, by using the instant messaging client, an instant messaging user identifier that has logged in locally and an attendance credential included in the protocol string.

S1508: Send the instant messaging user identifier and the attendance credential to a server, so that the server adds the instant messaging user identifier to an instant messaging user group corresponding to the attendance credential.

S1510: Establish an Internet channel that is based on the instant messaging user group to the server, the Internet channel being used for transmitting communication data of a member in the instant messaging user group.

According to the foregoing conferencing communication method, the instant messaging client may be automatically invoked by using the protocol string, so that the instant messaging user identifier and the attendance credential that is included in the protocol string can be directly obtained by using the instant messaging client, and the Internet channel that is based on the instant messaging user group is established according to the instant messaging user identifier and the attendance credential. A remote conference may be implemented by transmitting the communication data of the member in the instant messaging user group through the Internet channel. Compared with a current remote conference in a telephone conference form, a fixed telephone number does not need to be manually dialed, nor does a conference password need to be manually entered, simplifying an operation, and improving efficiency of implementing the remote conference.

Figure 16:
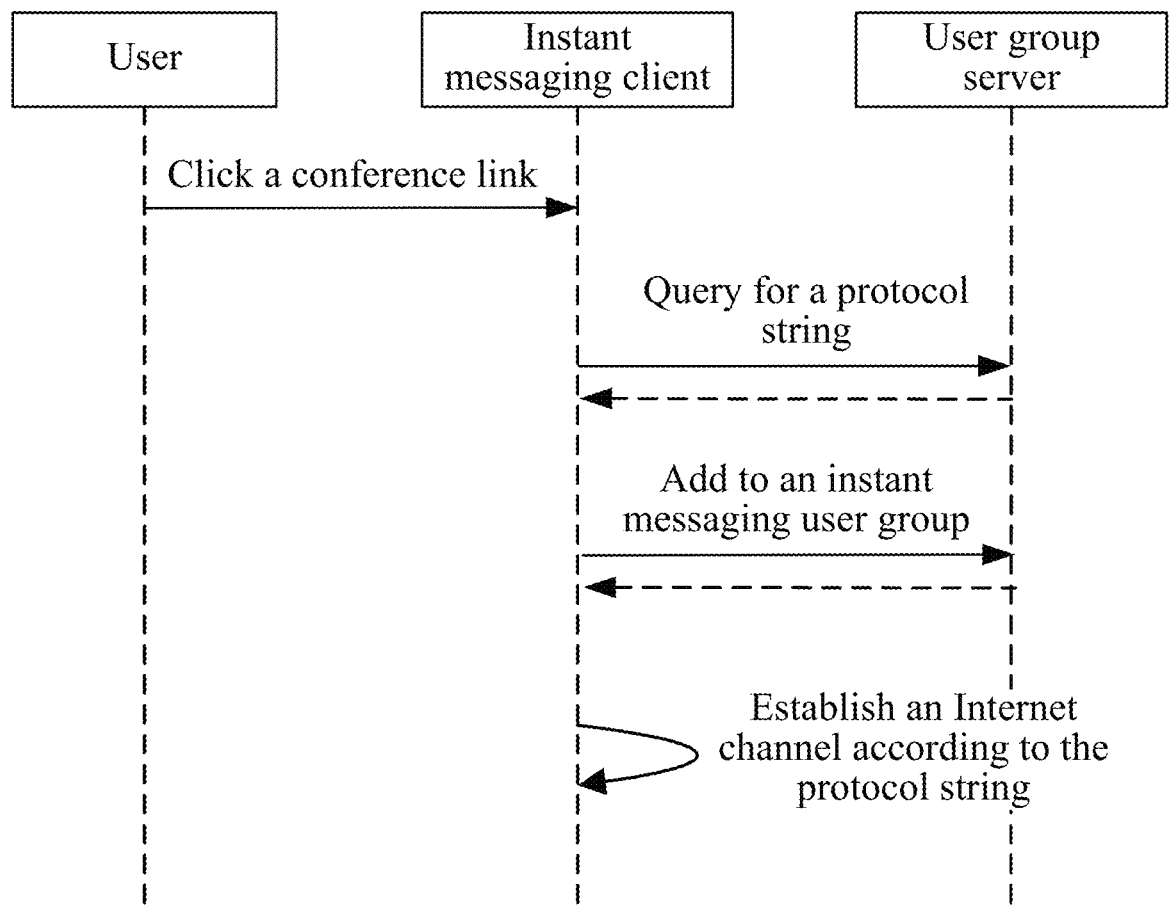
FIG. 16 is a sequence diagram for joining a conference according to a conference link according to an embodiment.

Referring to FIG. 16, in an embodiment, before step S1502, the method further includes: sending a conference scheduling request to the server, so that the server creates an empty instant messaging user group according to the conference scheduling request, and generates a corresponding protocol string; and receiving a corresponding conference link to which the protocol string is mapped and that is fed back by the server; and step S1502 includes: obtaining, from the server, the protocol string corresponding to the conference link.

In this embodiment, when a conference is scheduled, the empty instant messaging user group is created, and subsequent joining to the conference may be implemented by directly joining the created instant messaging user group, improving efficiency of implementing the remote conference. The protocol string is mapped to the conference link, to prevent the protocol string from being directly exposed, so that security of the protocol string can be ensured to an extent. In addition, the conference link can be directly triggered and accessed by using a browser, and can be supported by each intelligent terminal, improving compatibility.

In an embodiment, after step S1510, the method further includes: obtaining a call noise monitoring result of each member in the instant messaging user group; displaying, in correspondence to each member in the instant messaging user group, the corresponding call noise monitoring result; detecting a mute instruction; and performing mute processing on a member that is in the instant messaging user group and that is targeted by the mute instruction.

In this embodiment, the instant messaging client may actively invite a user of the telephone terminal to attend the conference, and is compatible with more conference attendance forms. In addition, operating the instant messaging client is more convenient than dialing a telephone, so that remote conference attendance can be more timely and convenient.

In an embodiment, after step S1510, the method further includes: obtaining an invitee telephone number; and sending the invitee telephone number to the server, so that the server adds the telephone number to the instant messaging user group, calls a telephone terminal corresponding to the invitee telephone number, and establishes a telephone network channel to the telephone terminal, the telephone network channel being used for transmitting the communication data of the member in the instant messaging user group.

In this embodiment, the instant messaging client may actively invite a user of the telephone terminal to attend the conference, and is compatible with more conference attendance forms. In addition, operating the instant messaging client is more convenient than dialing a telephone, so that remote conference attendance can be more timely and convenient.

Figure 17:
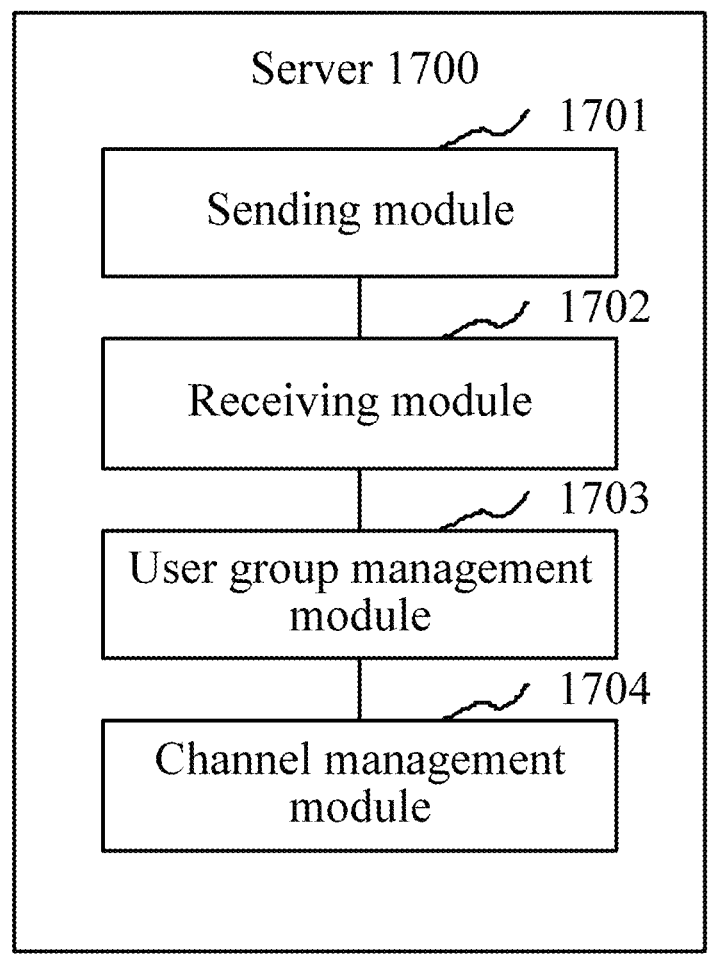
FIG. 17 is a structural block diagram of a server according to an embodiment.

FIG. 17 is a structural block diagram of a server 1700 according to an embodiment. An internal structure of the server 1700 may correspond to the structure shown in FIG. 5. Some or all of the following modules may be implemented by using software, hardware, or a combination thereof. Referring to FIG. 17, the server 1700 includes: a sending module 1701, a receiving module 1702, a user group management module 1703, and a channel management module 1704.

The sending module 1701 is configured to send a protocol string to an intelligent terminal, so that the intelligent terminal invokes a corresponding instant messaging client according to the protocol string.

The receiving module 1702 is configured to receive an instant messaging user identifier that has logged in and that is sent by the instant messaging client and an attendance credential included in the protocol string.

The user group management module 1703 is configured to add the instant messaging user identifier to an instant messaging user group corresponding to the attendance credential.

The channel management module 1704 is configured to establish an Internet channel that is based on the instant messaging user group to the instant messaging client, the Internet channel being used for transmitting communication data of a member in the instant messaging user group.

Figure 18:
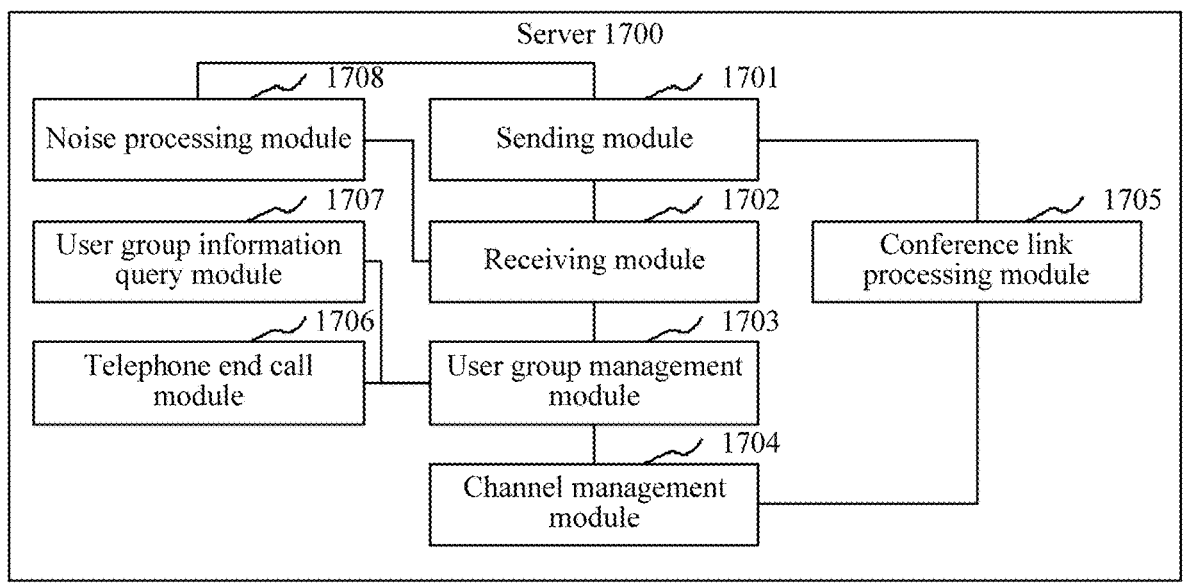
FIG. 18 is a structural block diagram of a server according to another embodiment.

FIG. 18 is a structural block diagram of a server 1700 according to another embodiment. Referring to FIG. 18, the server 1700 further includes: a conference link processing module 1705.

The user group management module 1703 is further configured to: receive a conference scheduling request; create an empty instant messaging user group according to the conference scheduling request; and generate a protocol string corresponding to the instant messaging user group.

The conference link processing module 1705 is configured to map the protocol string to a corresponding conference link.

The sending module 1701 is further configured to send the conference link to the intelligent terminal.

The receiving module 1702 is further configured to receive an access request initiated by the intelligent terminal according to the conference link.

The sending module 1701 is further configured to feed back the protocol string to the intelligent terminal according to the access request.

In an embodiment, the server 1700 further includes: a telephone terminal call module 1706, configured to: receive a call request that is initiated by a telephone terminal according to an attendance switchboard number; establish a telephone network channel to the telephone terminal according to the call request; and receive a conference number through the telephone network channel.

The user group management module 1703 is further configured to: query for the instant messaging user group corresponding to the conference number; and add, to the found instant messaging user group, a telephone number that initiates the call request.

The channel management module 1704 is further configured to enable the telephone network channel to be connected to the Internet channel.

In an embodiment, the receiving module 1702 is further configured to receive an invitee telephone number sent by the instant messaging client.

The user group management module 1703 is further configured to add the telephone number to the instant messaging user group.

The telephone terminal call module 1706 is further configured to: call a telephone terminal corresponding to the invitee telephone number, and establish a telephone network channel to the telephone terminal.

The channel management module 1704 is further configured to enable the telephone network channel to be connected to the Internet channel.

In an embodiment, the server 1700 further includes: a user group information query module 1707, configured to: receive a keypad data packet sent by the telephone terminal through the telephone network channel; parse the keypad data packet into a key value; query for information that is about the instant messaging user group and that is corresponding to the key value; generate a voice announcement of the found or queried information; and transmit the voice announcement to the telephone terminal through the telephone network channel.

In an embodiment, the server 1700 further includes: a noise processing module 1708, configured to: obtain a call noise monitoring result of each member in the instant messaging user group; send the call noise monitoring result to the instant messaging client; receive a mute instruction sent by the instant messaging client; and perform, according to the mute instruction, mute processing on a member that is in the instant messaging user group and that is targeted by the mute instruction.

According to the foregoing server 1700, the instant messaging client may be automatically invoked by using the protocol string, so that the instant messaging user identifier and the attendance credential that is included in the protocol string can be directly obtained by using the instant messaging client, and the Internet channel that is based on the instant messaging user group is established according to the instant messaging user identifier and the attendance credential. A remote conference may be implemented by transmitting the communication data of the member in the instant messaging user group through the Internet channel. Compared with a current remote conference in a telephone conference form, a fixed telephone number does not need to be manually dialed, nor does a conference password need to be manually entered, simplifying an operation, and improving efficiency of implementing the remote conference.

Figure 19:
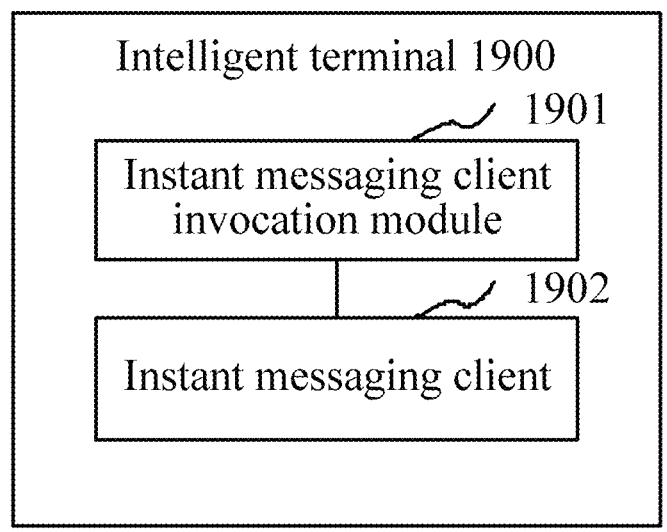
FIG. 19 is a structural block diagram of an intelligent terminal according to still another embodiment.

FIG. 19 is a structural block diagram of an intelligent terminal 1900 according to an embodiment. An internal structure of the intelligent terminal 1900 may correspond to the structure shown in FIG. 4. Some or all of the following modules may be implemented by using software, hardware, or a combination thereof. Referring to FIG. 19, the intelligent terminal 1900 includes: an instant messaging client invocation module 1901 and an instant messaging client 1902.

The instant messaging client invocation module 1901 is configured to: obtain a protocol string; and invoke a corresponding instant messaging client according to the protocol string.

The instant messaging client 1902 is configured to: obtain, by using the instant messaging client, an instant messaging user identifier that has logged in locally and an attendance credential included in the protocol string; send the instant messaging user identifier and the attendance credential to a server, so that the server adds the instant messaging user identifier to an instant messaging user group corresponding to the attendance credential; and establish an Internet channel that is based on the instant messaging user group to the server, the Internet channel being used for transmitting communication data of a member in the instant messaging user group.

Figure 20:
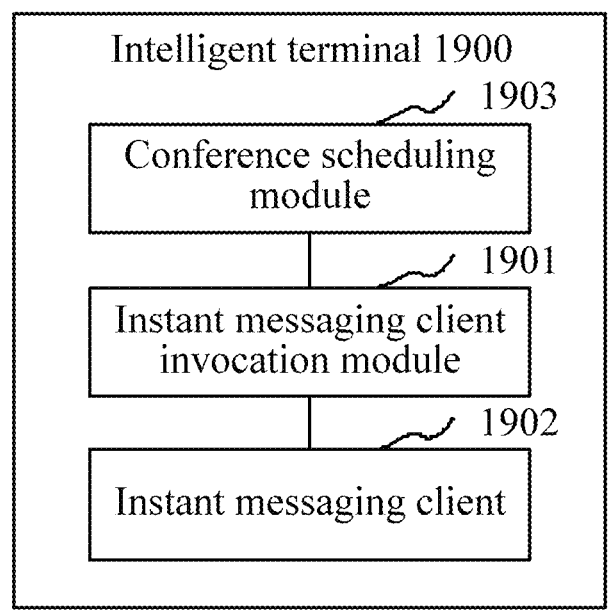
FIG. 20 is a structural block diagram of an intelligent terminal according to yet another embodiment.

FIG. 20 is a structural block diagram of an intelligent terminal 1900 according to another embodiment. Referring to FIG. 20, the intelligent terminal 1900 includes: a conference scheduling module 1903.

The conference scheduling module 1903 is configured to: send a conference scheduling request to a server, so that the server creates an empty instant messaging user group according to the conference scheduling request, and generates a corresponding protocol string; and receive a corresponding conference link to which the protocol string is mapped and that is fed back by the server.

The instant messaging client invocation module 1901 is further configured to obtain, from the server, the protocol string corresponding to the conference link.

In an embodiment, the instant messaging client 1902 is further configured to: obtain a call noise monitoring result of each member in the instant messaging user group; display, in correspondence to each member in the instant messaging user group, the corresponding call noise monitoring result; detect a mute instruction; and perform mute processing on a member that is in the instant messaging user group and that is targeted by the mute instruction.

In an embodiment, the instant messaging client 1902 is further configured to: obtain an invitee telephone number; and send the invitee telephone number to the server, so that the server adds the telephone number to the instant messaging user group, calls a telephone terminal corresponding to the invitee telephone number, and establishes a telephone network channel to the telephone terminal, the telephone network channel being used for transmitting the communication data of the member in the instant messaging user group.

According to the foregoing intelligent terminal 1900, the instant messaging client may be automatically invoked by using the protocol string, so that the instant messaging user identifier and the attendance credential that is included in the protocol string can be directly obtained by using the instant messaging client, and the Internet channel that is based on the instant messaging user group is established according to the instant messaging user identifier and the attendance credential. A remote conference may be implemented by transmitting the communication data of the member in the instant messaging user group through the Internet channel. Compared with a current remote conference in a telephone conference form, a fixed telephone number does not need to be manually dialed, nor does a conference password need to be manually entered, simplifying an operation, and improving efficiency of implementing the remote conference.

In an embodiment, a server is provided. The server includes a processor and a memory. The memory stores a computer readable instruction. When being executed by the processor, the computer readable instruction enables the processor to perform a step in the conferencing communication method in any of the foregoing embodiments.

In an embodiment, an intelligent terminal is provided. The intelligent terminal includes a processor and a memory. The memory stores a computer readable instruction. When being executed by the processor, the computer readable instruction enables the processor to perform a step in the conferencing communication method in any of the foregoing embodiments.

In an embodiment, a non-volatile computer readable storage medium is provided, and stores a computer readable instruction. When being executed by one or more processors, the computer readable instruction enables the one or more processors to perform a step in the conferencing communication method in any of the foregoing embodiments.

A person of ordinary skill in the art can understand that all or some of the procedures in the methods of the foregoing embodiments may be implemented by a computer program instructing related hardware. The program may be stored in a non-volatile computer-readable storage medium. When the program is executed, the procedures of the embodiments of the foregoing methods may be performed. Any reference to a memory, a storage device, a database, or other mediums in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. For description instead of limitation, the RAM may be in a plurality of forms such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiment are described. However, the combinations of the technical features should all be considered as falling within the scope described in this specification provided that they do not conflict with each other. The foregoing embodiments only show several implementations of this application and are described in detail, but they should not be construed as a limit to the patent scope of this application. It should be noted that a person of ordinary skill in the art may further make several variations and improvements without departing from the idea of this application, and the variations and improvements all fall within the protection scope of this application. Therefore, the patent protection scope of this application shall be subject to the appended claims.

What is claimed is:

1. A method for performing a conference communication, the method comprising:
    sending, by a server comprising a memory storing instructions and a processor in communication with the memory, a protocol string to an intelligent terminal, so that the intelligent terminal automatically invokes an instant messaging (IM) client according to the protocol string for sending IM invitations of the conference communication to one or more other IM users, the protocol string and the IM invitations comprising an attendance credential of the conference communication corresponding to an IM user group that is empty when initially scheduled by the server;
    receiving, by the server, an IM user identifier and the attendance credential sent from a corresponding IM client of one of the intelligent terminal and the one or more other IM users that has logged in;
    adding, by the server the IM user identifier to the IM user group; and
    establishing, by the server, an Internet channel based on the IM user group, the Internet channel being used for transmitting communication data of a member in the IM user group for the conference communication.

2. The method according to claim 1, wherein:
    before the sending the protocol string to the intelligent terminal, the method further comprises:
        receiving, by the server, a conference scheduling request;
        creating, by the server, the IM user group according to the conference scheduling request, the IM user group comprising no member at time of its creation;
        generating, by the server, the protocol string corresponding to the IM user group;
        mapping, by the server, a conference link based on the protocol string; and
        sending, by the server, the conference link to the intelligent terminal; and
    the sending the protocol string to the intelligent terminal comprises:
        receiving, by the server, an access request initiated by the intelligent terminal according to the conference link; and
        feeding back, by the server, the protocol string to the intelligent terminal according to the access request.

3. The method according to claim 1, wherein the method further comprises:
    receiving, by the server, a call request that is initiated by a telephone terminal comprising a telephone number;
    establishing, by the server, a telephone network channel to the telephone terminal according to the call request;
    receiving, by the server, a conference number through the telephone network channel;
    querying, by the server, for the IM user group corresponding to the conference number;
    adding, by the server, to the IM user group, the telephone number of the telephone terminal; and
    connecting, by the server, the telephone network channel and the Internet channel.

4. The method according to claim 3, wherein the method further comprises:
    receiving, by the server, a keypad data packet sent by the telephone terminal through the telephone network channel;
    parsing, by the server, the keypad data packet into a key value;
    querying, by the server, for information of the IM user group and corresponding to the key value;
    generating, by the server, a voice announcement corresponding to the queried information; and
    transmitting, by the server, the voice announcement to the telephone terminal through the telephone network channel.

5. The method according to claim 1, wherein the method further comprises:

receiving, by the server, an invitee telephone number sent by the IM client;
adding, by the server, the invitee telephone number to the IM user group;
calling, by the server, a telephone terminal corresponding to the invitee telephone number, and establishing a telephone network channel to the telephone terminal; and
connecting, by the server, the telephone network channel and the Internet channel.

6. The method according to claim 5, wherein the method further comprises:
receiving, by the server, a keypad data packet sent by the telephone terminal through the telephone network channel;
parsing, by the server, the keypad data packet into a key value;
querying, by the server, for information of the IM user group and corresponding to the key value;
generating, by the server, a voice announcement corresponding to the queried information; and
transmitting, by the server, the voice announcement to the telephone terminal through the telephone network channel.

7. The method according to claim 1, wherein the method further comprises:
obtaining, by the server, a call noise monitoring result of each member in the IM user group;
sending, by the server, the call noise monitoring result to the IM client;
receiving, by the server, a mute instruction sent by the IM client; and
performing, by the server, according to the mute instruction, mute processing on a member that is in the IM user group and that is targeted by the mute instruction.

8. A server for performing a conference communication, the server comprising:
a memory storing instructions; and
a processor in communication with the memory, when the processor executes the instructions, the processor is configured to cause the server to:
send a protocol string to an intelligent terminal, so that the intelligent terminal automatically invokes an instant messaging (IM) client according to the protocol string for sending IM invitations of the conference communication to one or more other IM users, the protocol string and the IM invitations comprising an attendance credential of the conference communication corresponding to an IM user group that is empty when initially scheduled by the server;
receive an IM user identifier and the attendance credential in the protocol string sent from a corresponding IM client of one of the intelligent terminal and the one or more other IM users that has logged in;
add the IM user identifier to the IM user group corresponding to the attendance credential; and
establish an Internet channel based on the IM user group, the Internet channel being used for transmitting communication data of a member in the IM user group for the conference communication.

9. The server according to claim 8, wherein:
before the processor is configured to cause the server to send the protocol string to the intelligent terminal, the processor is configured to cause the server to:
receive a conference scheduling request;
create the IM user group according to the conference scheduling request, the IM user group comprising no member at time of its creation;
generate the protocol string corresponding to the IM user group;
map a conference link based on the protocol string; and
send the conference link to the intelligent terminal; and
when the processor is configured to cause the server to send the protocol string to the intelligent terminal, the processor is configured to cause the server to:
receive an access request initiated by the intelligent terminal according to the conference link; and
feed back the protocol string to the intelligent terminal according to the access request.

10. The server according to claim 8, wherein when the processor executes the instructions, the processor is further configured to cause the server to:
receive a call request that is initiated by a telephone terminal comprising a telephone number;
establish a telephone network channel to the telephone terminal according to the call request;
receive a conference number through the telephone network channel;
query for the IM user group corresponding to the conference number;
add, to the IM user group, the telephone number of the telephone terminal; and
connect the telephone network channel and the Internet channel.

11. The server according to claim 10, wherein when the processor executes the instructions, the processor is further configured to cause the server to:
receive a keypad data packet sent by the telephone terminal through the telephone network channel;
parse the keypad data packet into a key value;
query for information of the IM user group and corresponding to the key value;
generate a voice announcement corresponding to the queried information; and
transmitting the voice announcement to the telephone terminal through the telephone network channel.

12. The server according to claim 8, wherein when the processor executes the instructions, the processor is further configured to cause the server to:
receive an invitee telephone number sent by the IM client;
add the invitee telephone number to the IM user group;
call a telephone terminal corresponding to the invitee telephone number, and establish a telephone network channel to the telephone terminal; and
connect the telephone network channel and the Internet channel.

13. The server according to claim 12, wherein when the processor executes the instructions, the processor is further configured to cause the server to:
receive a keypad data packet sent by the telephone terminal through the telephone network channel;
parse the keypad data packet into a key value;
query for information of the IM user group and corresponding to the key value;
generate a voice announcement corresponding to the queried information; and
transmitting the voice announcement to the telephone terminal through the telephone network channel.

14. The server according to claim 8, wherein when the processor executes the instructions, the processor is further configured to cause the server to:

obtain a call noise monitoring result of each member in the IM user group;
send the call noise monitoring result to the IM client;
receive a mute instruction sent by the IM client; and
perform, according to the mute instruction, mute processing on a member that is in the IM user group and that is targeted by the mute instruction.

15. A non-transitory computer readable storage medium, storing computer readable instructions, when being executed by a processor, the computer readable instructions cause the processor to perform:
sending a protocol string to an intelligent terminal, so that the intelligent terminal automatically invokes an instant messaging (IM) client according to the protocol string for sending IM invitations of the conference communication to one or more other IM users, the protocol string and the IM invitations comprising an attendance credential;
receiving an IM user identifier and the attendance credential sent from a corresponding IM client of one of the intelligent terminal and the one or more other IM users that has logged in;
adding the IM user identifier to the IM user group corresponding to the attendance credential of the conference communication corresponding to an IM user group that is empty when initially scheduled; and
establishing an Internet channel based on the IM user group, the Internet channel being used for transmitting communication data of a member in the IM user group for the conference communication.

16. The non-transitory computer readable storage medium according to claim 15, wherein:
before the computer readable instructions cause the processor to perform the sending the protocol string to the intelligent terminal, the computer readable instructions cause the processor to perform:
receiving a conference scheduling request;
creating the 1M user group according to the conference scheduling request, the 1M user group comprising no member at time of its creation;
generating the protocol string corresponding to the 1M user group;
mapping a conference link based on the protocol string; and
sending the conference link to the intelligent terminal; and
when the computer readable instructions cause the processor to perform the sending the protocol string to the intelligent terminal, the computer readable instructions cause the processor to perform:
receiving an access request initiated by the intelligent terminal according to the conference link; and
feeding back the protocol string to the intelligent terminal according to the access request.

17. The non-transitory computer readable storage medium according to claim 15, wherein the computer readable instructions further cause the processor to perform:
receiving a call request that is initiated by a telephone terminal comprising a telephone number;
establishing a telephone network channel to the telephone terminal according to the call request;
receiving a conference number through the telephone network channel;
querying for the IM user group corresponding to the conference number;
adding to the IM user group, the telephone number of the telephone terminal; and
connecting the telephone network channel and the Internet channel.

18. The non-transitory computer readable storage medium according to claim 17, wherein the computer readable instructions further cause the processor to perform:
receiving a keypad data packet sent by the telephone terminal through the telephone network channel;
parsing the keypad data packet into a key value;
querying for information of the IM user group and corresponding to the key value;
generating a voice announcement corresponding to the queried information; and
transmitting the voice announcement to the telephone terminal through the telephone network channel.

19. The non-transitory computer readable storage medium according to claim 15, wherein the computer readable instructions further cause the processor to perform:
receiving an invitee telephone number sent by the IM client;
adding the invitee telephone number to the IM user group;
calling a telephone terminal corresponding to the invitee telephone number, and establishing a telephone network channel to the telephone terminal; and
connecting the telephone network channel and the Internet channel.

20. The non-transitory computer readable storage medium according to claim 15, wherein the computer readable instructions further cause the processor to perform:
obtaining a call noise monitoring result of each member in the IM user group;
sending the call noise monitoring result to the IM client;
receiving a mute instruction sent by the IM client; and
performing according to the mute instruction, mute processing on a member that is in the IM user group and that is targeted by the mute instruction.

* * * * *

UNITED STATES PATENT AND TRADEMARK OFFICE
CERTIFICATE OF CORRECTION

PATENT NO. : 11,196,783 B2
APPLICATION NO. : 16/433307
DATED : December 7, 2021
INVENTOR(S) : Xingshi Bai et al.

It is certified that error appears in the above-identified patent and that said Letters Patent is hereby corrected as shown below:

In the Claims

In Column 19, Claim 8, Lines 58-59, delete "corresponding to the attendance credential".

In Column 21, Claim 16, Line 38, delete "1M" and replace with --IM--.

In Column 21, Claim 16, Line 39, delete "1M" and replace with --IM--.

In Column 21, Claim 16, Line 41, delete "1M" and replace with --IM--.

Signed and Sealed this
Thirtieth Day of August, 2022

Katherine Kelly Vidal
*Director of the United States Patent and Trademark Office*